United States Patent [19]

Tanner

[11] Patent Number: 4,547,882
[45] Date of Patent: Oct. 15, 1985

[54] ERROR DETECTING AND CORRECTING MEMORIES

[75] Inventor: Robert M. Tanner, Capitola, Calif.

[73] Assignee: The Board of Trustees of The Leland Stanford Jr. University, Stanford, Calif.

[21] Appl. No.: 470,910

[22] Filed: Mar. 1, 1983

[51] Int. Cl.[4] ............................................. G06F 11/10
[52] U.S. Cl. .................................................... 371/38
[58] Field of Search ............................. 371/13, 38, 50

[56] References Cited

U.S. PATENT DOCUMENTS

| | | | |
|---|---|---|---|
| 4,175,692 | 11/1979 | Watanabe | 371/38 |
| 4,201,976 | 5/1980 | Patel | 371/50 |
| 4,205,324 | 5/1980 | Patel | 371/50 |
| 4,209,846 | 6/1980 | Seppa | 371/38 X |
| 4,295,218 | 10/1981 | Tanner | 371/40 |
| 4,319,356 | 3/1982 | Kocol et al. | 371/38 |
| 4,336,612 | 6/1982 | Inoue et al. | 371/38 X |

*Primary Examiner*—Charles E. Atkinson
*Attorney, Agent, or Firm*—Terrence E. Dooher; Alan H. MacPherson; Steven F. Caserza

[57] ABSTRACT

A system and procedure for organizing a digital memory by incorporating error correcting circuitry and error detecting circuitry into the memory based on the graph of an error-correcting code in tree form. The error detecting circuitry detects a variety of multiple errors in stored binary bits, and in addition detects certain failures in the memory circuitry. One embodiment coordinates a series of independent memory subarrays in an interdependent manner so that all of the bits in an arbitrarily large memory are organized so as to form several long code words in a single-error-correcting double-error-detecting code. Another embodiment organizes all of the bits in the memory so that they form a single codeword in a double-error-correcting, triple-error-detecting code derived from a projective plane. Coding efficiency is high: in the cases of a 256K memory, including the required parity check bits, only (33/32) 256K bits, approximately, must be stored. Single error correction can take place at the time of a read with very little additional delay compared to that of a normal irredundant memory.

36 Claims, 18 Drawing Figures

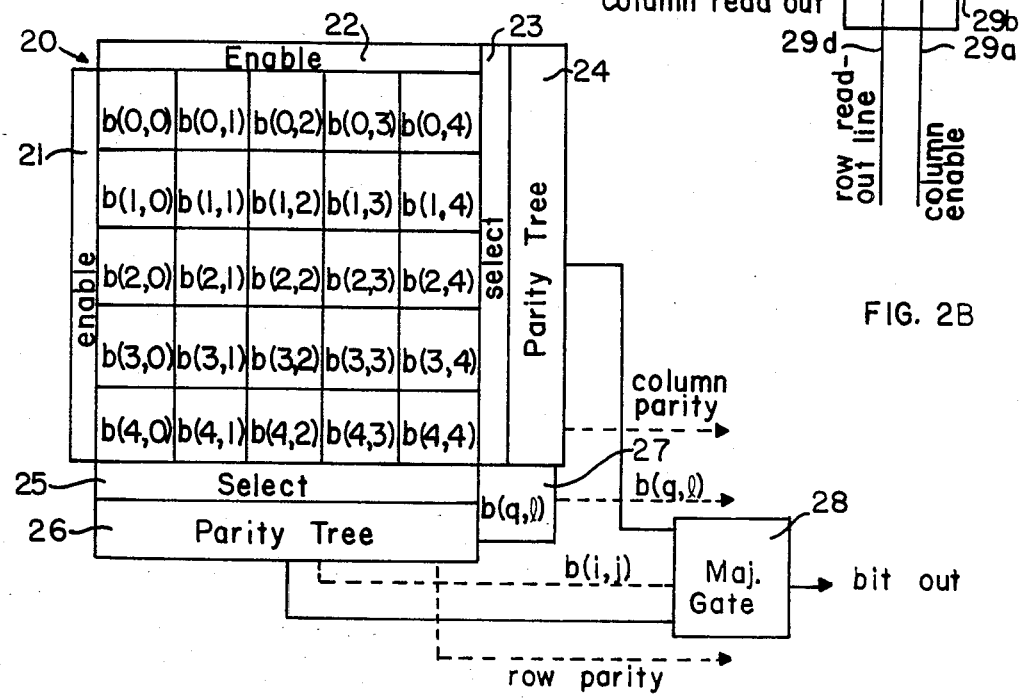
FIG. 2A Symmetric RAM
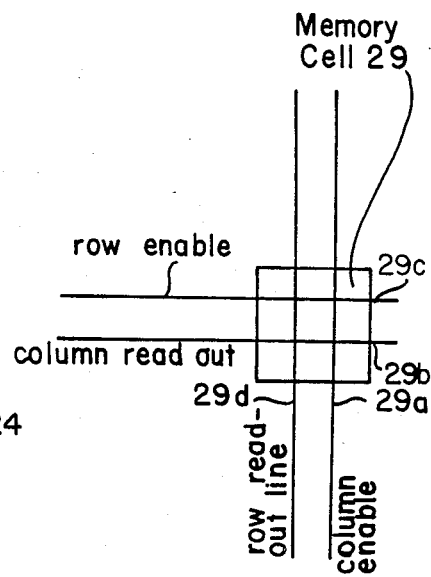
FIG. 1 Product Code Array
FIG. 2B

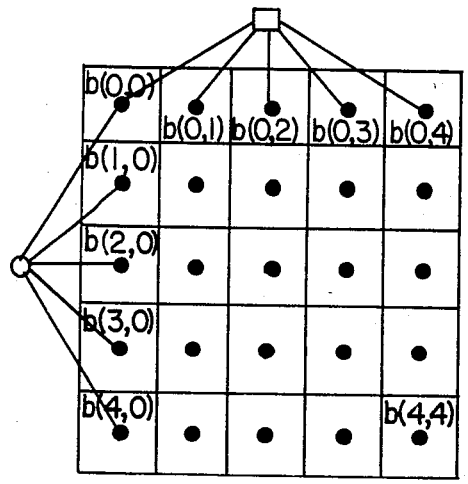
FIG. 3A Array
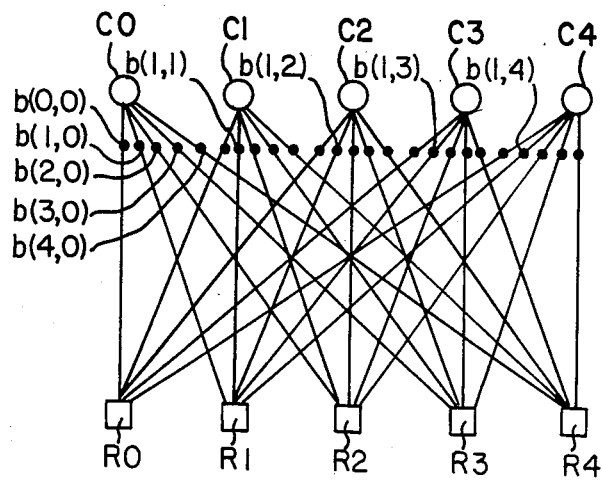
FIG. 3B Complete Bipartite Graph
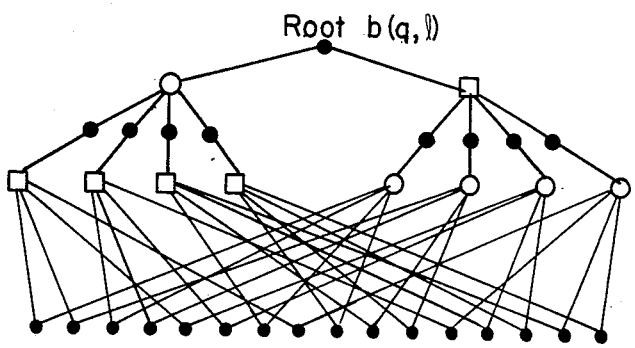
FIG. 3C Tree Form
FIG. 3  PRODUCT CODE AS GRAPH CODE

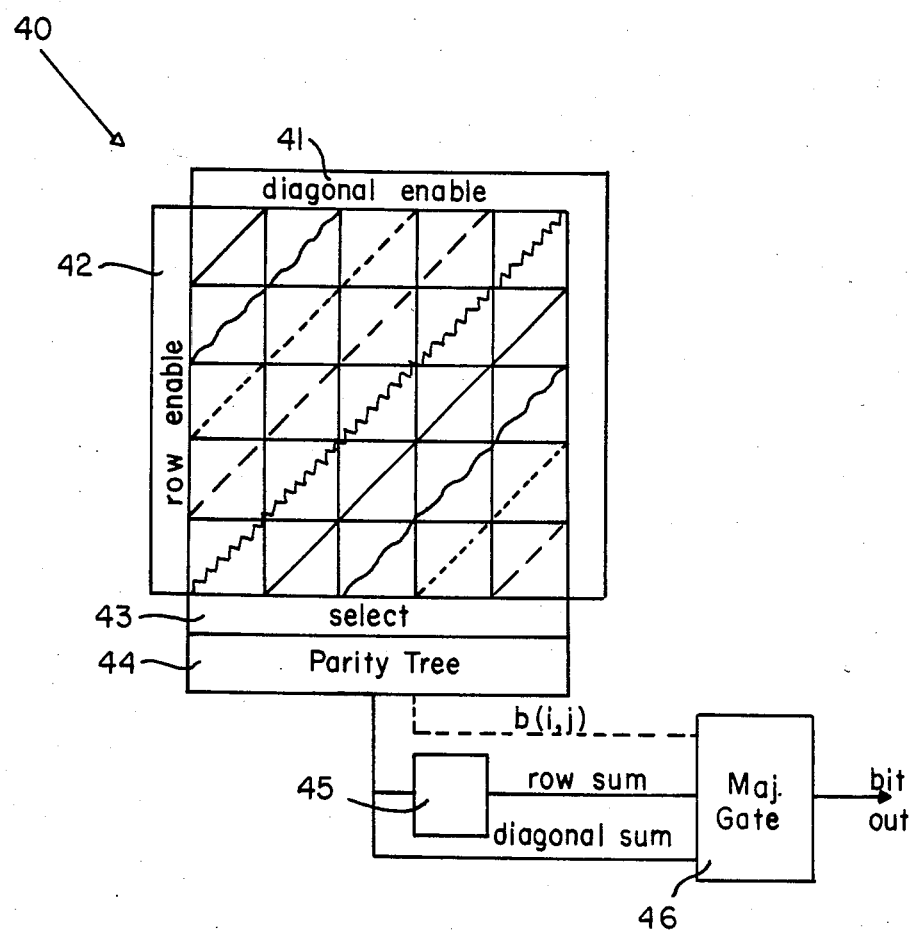
FIG. 4 Diagonal Enable RAM

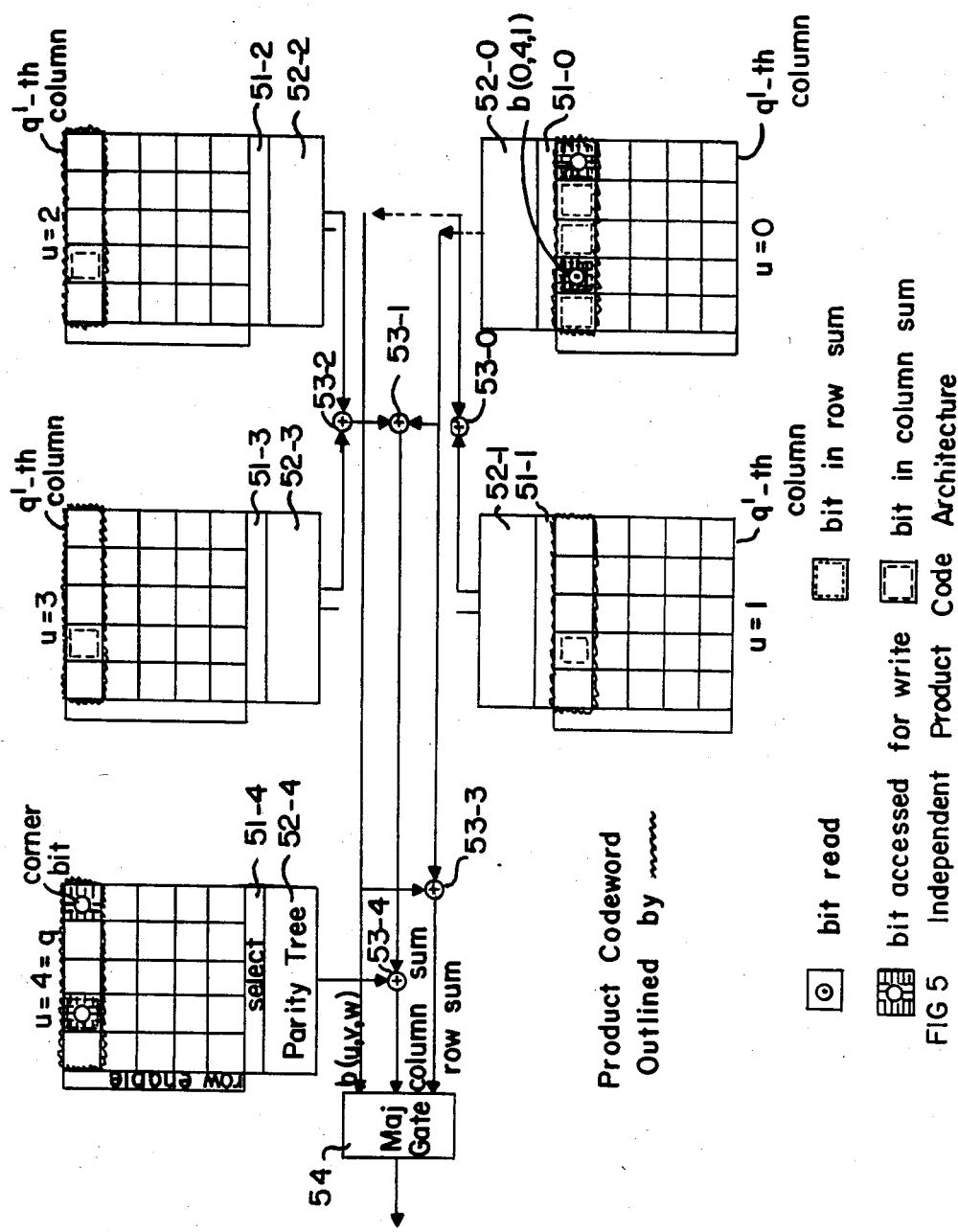

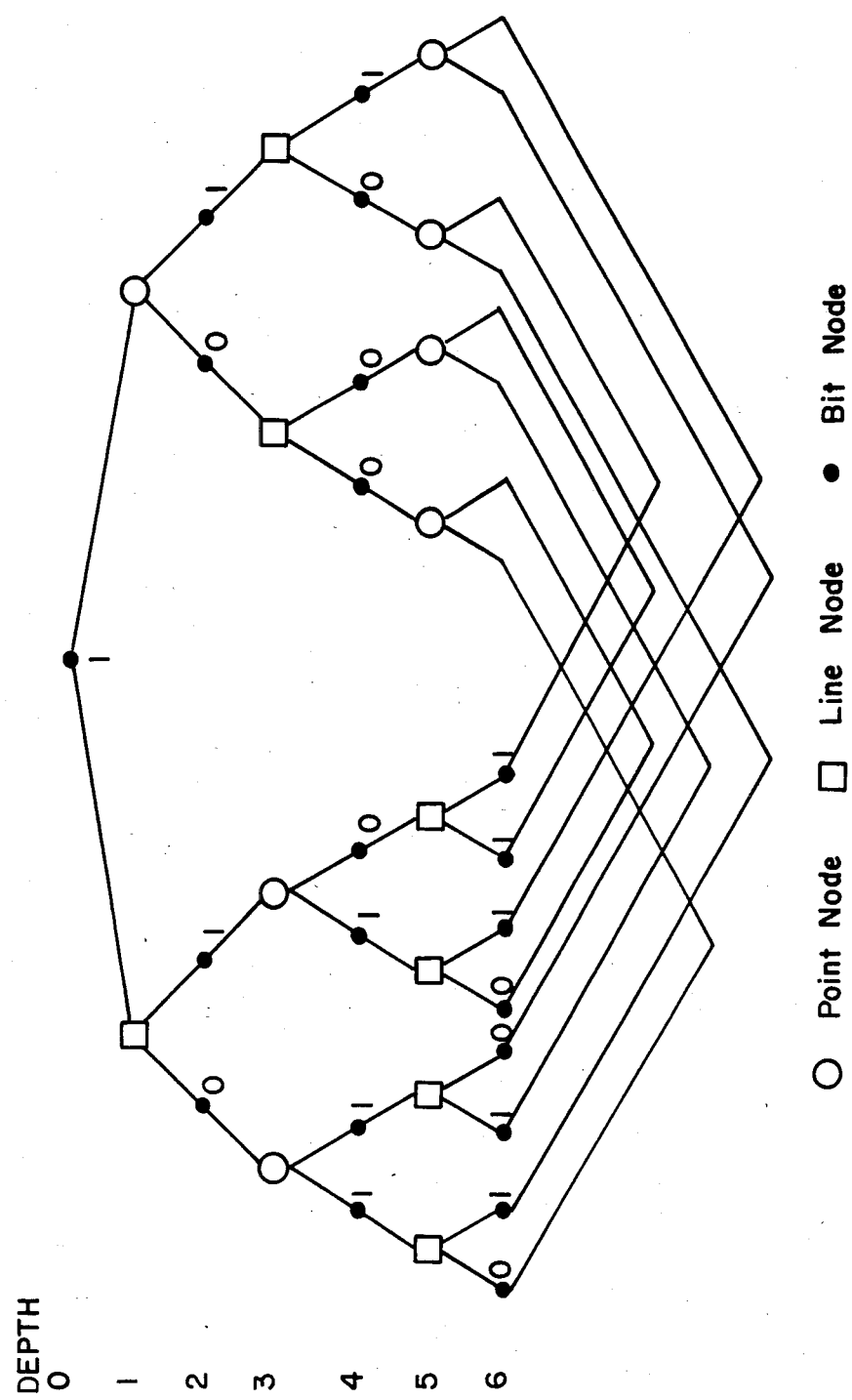
FIG. 6A A Projective Plane Graph in Tree Form (q=2)

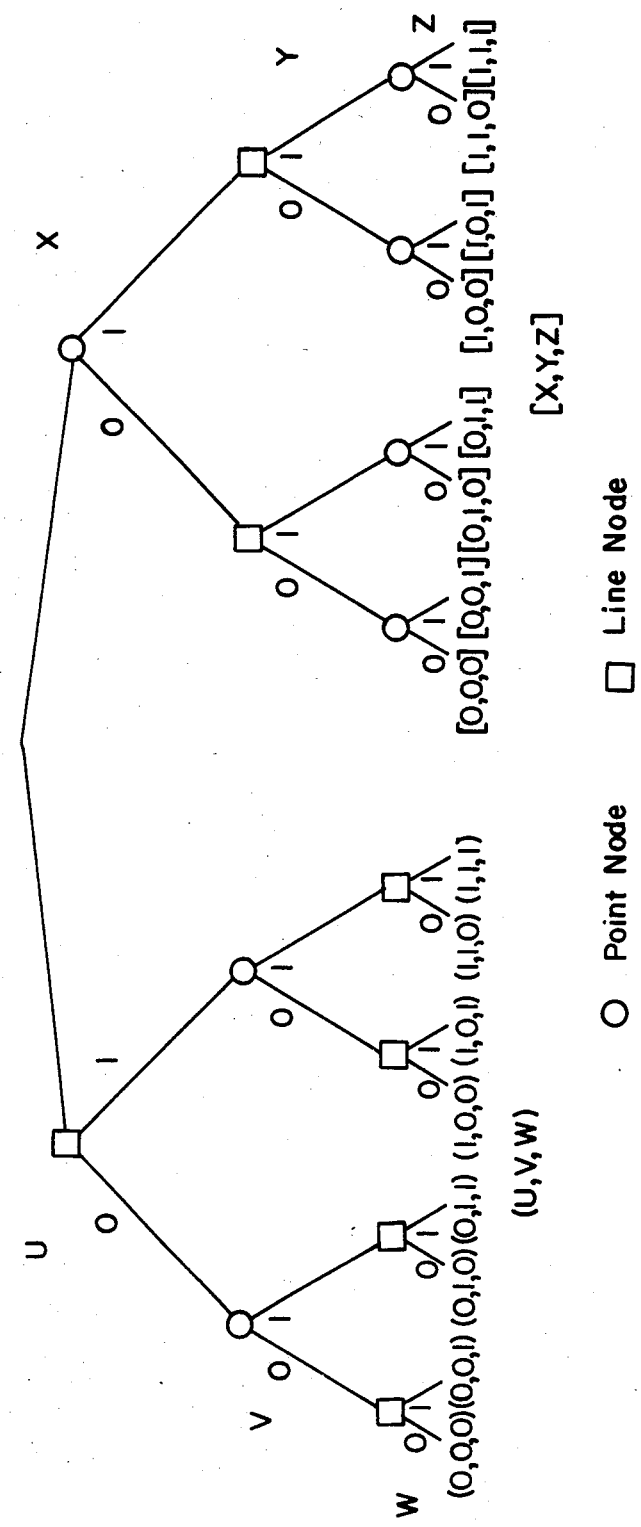
FIG. 6B  A Two-sided Tree for q=2

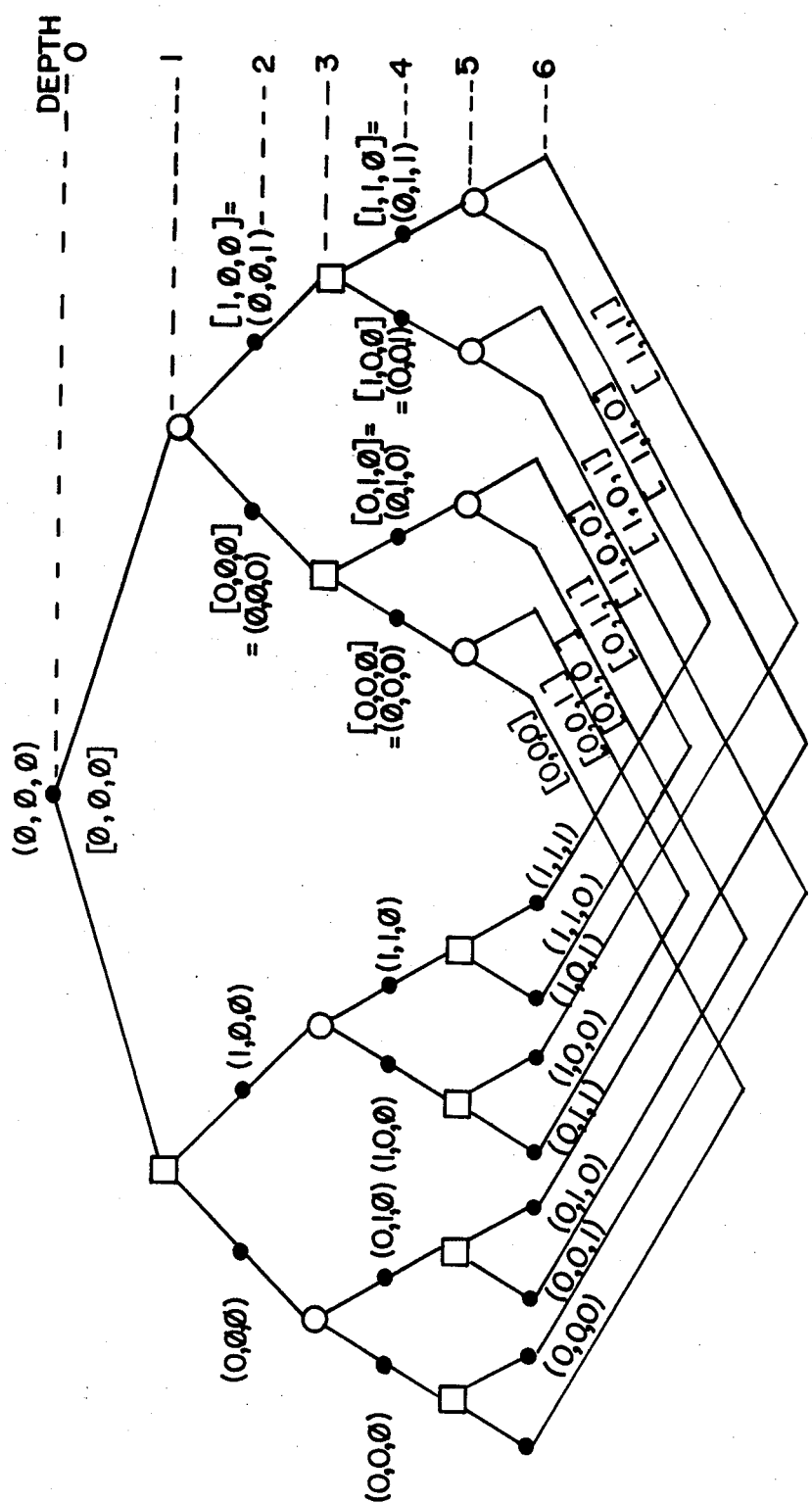
FIG. 6C  Bit Addresses in Graph in Tree Form  (q=2)

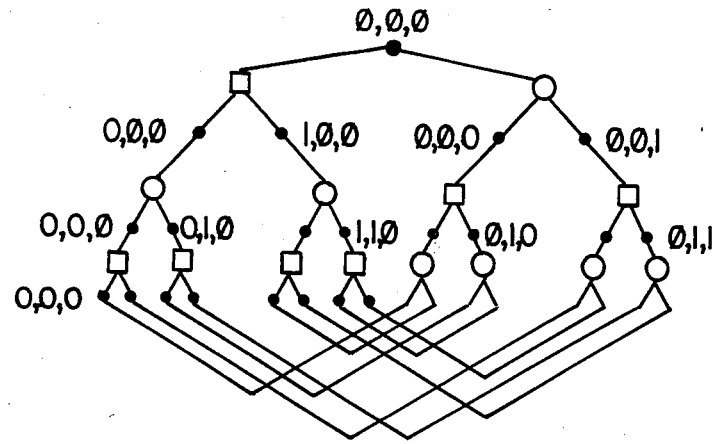
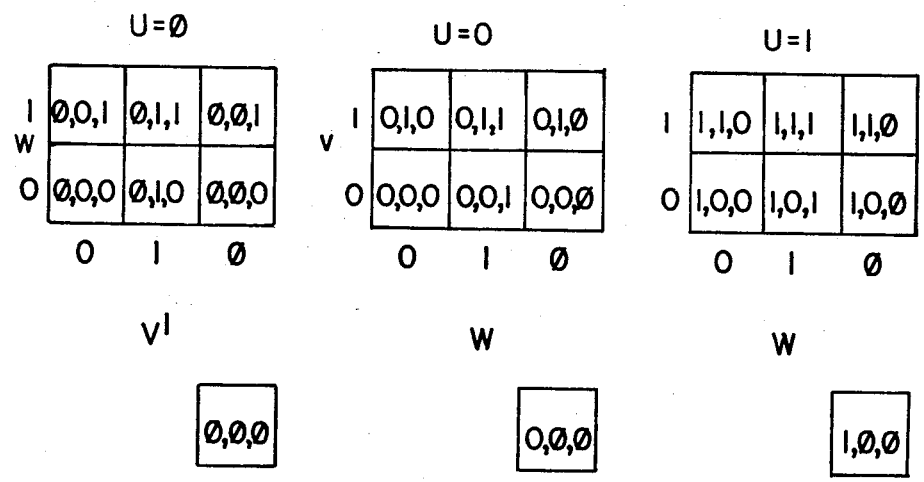
FIG.7 Mapping the Tree to on Array

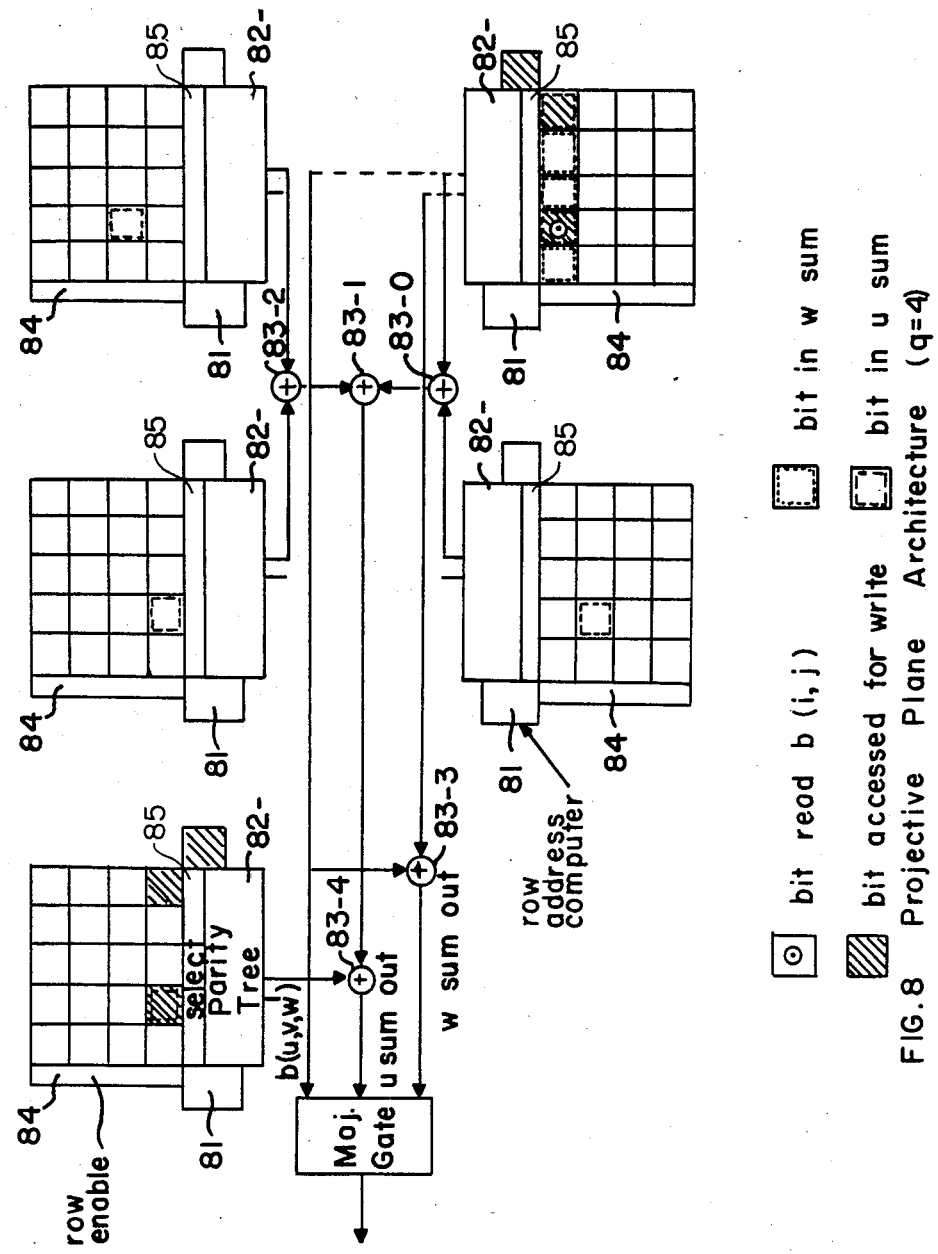
FIG. 8 Projective Plane Architecture (q=4)

ROW COMPUTERS FOR q=4
$u_0 = [0,0]$    $u_0 w = 0$    No Row Address Computer Needed
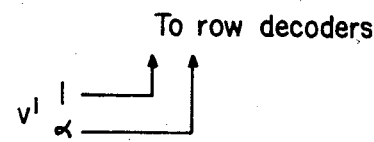
$u_0 = [1,0]$    $u_0 w = w$
$u_0 w = [w_0 w_1] \begin{bmatrix} 1 & 0 \\ 0 & 1 \end{bmatrix}$
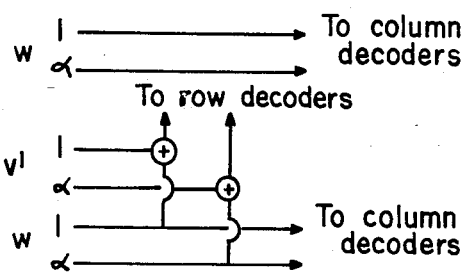
$u_0 = [0,1]$    $u_0 w = [w_0 w_1] \begin{bmatrix} 0 & 1 \\ 1 & 1 \end{bmatrix}$
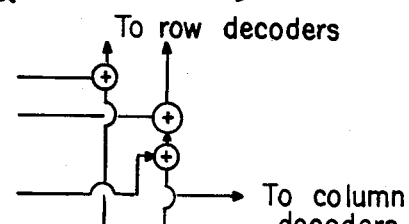
$u_0 = [1,1]$    $u_0 w = [w_0 w_1] \begin{bmatrix} 1 & 1 \\ 1 & 0 \end{bmatrix}$
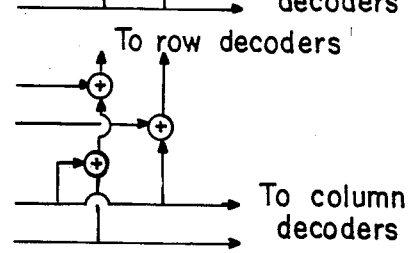
The $u_0 = \emptyset$ subarray just gives w to the <u>row</u> and $v^1$ to the <u>column</u> decoder.
FIG. 9

ERROR DETECTING AND CORRECTING MEMORIES

BACKGROUND OF THE INVENTION

1. Field of the Invention

The present invention relates to error correction and detection systems, methods, and procedures for digital memories.

2. Description Of The Prior Art

The increased vulnerability of high-density memory systems to both hard and soft errors has lead to greater interest in the use of error-correcting codes to improve system reliability. See Intel Corporation *Memory Design Handbook*, January 1981, pp 4–13 to 4–33. An approach now common in 16-bit word machines is to encode a word using a (22,16,4) single-error-correcting (SEC) double-error-detecting (DED) modified Hamming code, as suggested by Hsiao, M. Y., "*A Class of Optimal Minimum Odd-Weight-Column SEC–DEC Codes,*" IBM Jour. Res. Develop., July 1970, pp. 395–401. To those skilled in the coding arts, the first number 22 in the parenthetical expression (22, 16, 4) represents the total number of bits in a codeword, 16 represents the number of information bits in a codeword, and the third number 4 represents the minimum distance of the code. By "minimum distance" is meant the minimum number of positions in which any two codewords must have different values.

Supporting modified Hamming code chips are commercially available (e.g. Texas Instruments SN54/74S630). Elkind and Siewiorek suggest the use of a block code in a similar way in *Reliability and Performance of Error-Correcting Memory and Register Arrays,* IEEE Trans. Comp., Vol. C-29 No. 10, October 1980 pp. 920–927. Bossen and Hsiao discuss the use of a longer code of the same type in conjunction with a more powerful microcode and hardware correction algorithm. See Bossen, D. C. and Hsiao, M. Y. *A System Solution to the Memory Soft Error Problem,* IBM Jour. Res. Develop., Vol. 24, No. 3, May 1980, pp. 390–397.

U.S. Pat. No. 4,277,844 issued July 7, 1981 to Robert J. Hancock, et al. discloses an error detection and correcting method employing a combination of a Hamming code and a cyclic redundancy code.

Barton in his thesis *A Fault Tolerant Integrated Cirouit Memory,* Ph.D. Thesis, Computer Soience, Calif. Inst. Tech., April 1980, proposes the construction of a hierachical memory based on multi-layer error-correcting coding that can tolerate numerous faults. His design constitutes an architectural realization of the product codes of Elias described in *Error-free Coding,* IRE Trans. Inform. Theory, Vol. PGIT-4, pp. 29–37, September 1964.

A product code is a rectangular array where each row in the array forms a codeword in some error correcting code and each column forms a codeword in some error correcting code. Both codes are usually linear.

All of these approaches have a relatively high coding overhead inasmuch as a substantial fraction of the physical memory is devoted to the storage of redundant parity checks. This arises from the use of relatively short coding blocks chosen for the sake of keeping the encoding and decoding times short, since these times are a substantial part of the resulting memory access times.

The use of an error-correcting code for protecting a memory inevitably involves a trade-off between coding efficiency on the one hand, and computation and communication costs on the other. As is well known in coding theory, to correct a fixed number of errors with very little coding overhead the block length of the code must be large, enabling dependencies to be distributed over many bits. Correspondingly, however, the computation of the correct value of any bit of the codeword must involve a large number of the bits of the codeword, implying in turn the need for communication lines to access the bits and delay in the computations that interrelate them.

SUMMARY OF THE INVENTION

In accordance with this invention, structure is provided that achieves high coding efficiency by organizing a digital memory so that a large number if not all of the stored bits form a single codeword in a large block-length code. As will be seen below, the underlying principles can be applied at different levels of memory organization, depending on the nature of the basic memory unit (i.e., whether the basic memory unit is a binary bit or a string of binary bits).

In two embodiments of the invention a single chip 256K memory with one bit as the basic memory unit is constructed by coordinating access to multiple subarrays. In that context, a code is structured so that the communication lines required for error-correction are naturally available in customary VLSI circuit design.

In accordance with this invention, a memory is organized by embedding error detecting and error correcting graph codes into the memory. A graph code is a code defined by a graph consisting of a set of nodes which are connected by edges, and codewords are cycles or linear sums of cycles in the graph. In particular, SEC-DED codes based on the product code graph and on a modified product code graph, and a double-error-correcting triple-error-detecting code based on a graph derived from a projective plane are embedded into a memory.

The memory system and procedures disclosed represent a conceptual departure from customary practice. In this invention error-correcting and error-detecting memories are structured by implementing tree graphs having minimum cycle length greater than or equal to six.

In one preferred embodiment, the entire memory is organized into a single codeword, which achieves high coding efficiency, corrects all single errors, and detects multiple errors. Communication costs depend on the availability of row and column enables and outputs.

In a second preferred embodiment, a memory whose information bits are contained in a square array is organized into a single codeword by means of a tree graph and a modified product code. This embodiment maintains the high coding efficiency of the first embodiment and reduces the area penalty by time multiplexing the output lines. It corrects all single errors, and detects multiple errors.

Another embodiment of this invention (which also corrects all single errors and defects multiple errors) coordinates a series of independent memory subarrays wherein each subarray includes a plurality of rows and the subarrays together comprise one memory in an interdependent manner such that all of the bits in the memory are arranged in several long codewords with the property that the portion of a codeword in each of the independent subarrays occupies a single row in the subarray. In constructing a 256K memory, the coding efficiency is that of a 64×64 product code built from parity check codes on both rows and column of a rectangular array with approximately 1/33 of the total memory devoted to parities.

By structuring the memory so that it forms a single codeword in an error-correcting code, still another embodiment of the invention has the ability to correct all double errors, most triple errors, as well as a variety of other failures, while requiring only approximately 3% of the 256K memory to be devoted to redundant parity check bits.

In this embodiment, the interconnections of the memory are based on a projective plane graph. Some delay occurs when a bit is read out. The addresses must pass through one or more levels of exclusive-or's in the subarray address computers. The accessed bits are fed into a 65 input exclusive-or tree and then a three-input majority-logic circuit. When realized on a single chip, the increase in access time is less than that required to read information from a memory and pass it through error-correcting circuits on a separate chip. Writing a bit into the memory requires reading, modifying, and rewriting six bits, the minimum distance of the underlying error-correcting code. Both the area and time delay overhead are comparable to that for the SEC-DED embodiment using a series of product codes.

Although this last embodiment is described for a 256K chip where $q=64$ ($q^3$ is the number of information bits stored in the memory), the same invention can be built for any prime power q, the powers of two being those of principle interest for computer systems. A prime power is a number of the form $p^k$ where p is a prime positive integer and k is a positive integer.

In all of the embodiments, the systems and procedures disclosed use a bit as the basic unit. However, the same invention may be used at a higher level with a larger basic unit such as a word, or memory chip with additional addressing.

The objects of the invention include:
(a) increasing the efficiency of coding memories;
(b) reducing the communication time for detecting and correcting errors;
(c) increasing yields by permitting chips with manufacturing flaws to perform as though they were perfect irredundant memories;
(d) permitting chips with no flaws to have greater reliability in the field;
(e) providing a method for detecting and correcting double errors in data stored in a digital memory; and
(f) detecting certain circuit failures in the memory hardware.

This invention will be more fully understood in light of the following detailed description taken together with the following drawings:

BRIEF DESCRIPTION OF THE DRAWINGS

FIG. 1 illustrates a product code array showing a typical set of bit values satisfying all parity equations;

FIG. 2A and FIG. 2B illustrates a symmetric random access memory architecture permitting simultaneous access to both a row and column of bits;

FIG. 3A, FIG. 3B and FIG. 3C illustrate a technique converting a product code array into a bipartite graph in tree form through the creation of a bit node for every bit in the array and a parity check node for every parity check equation;

FIG. 4 shows a random access memory equipped with diagonal enable lines as well as row enable lines permitting either a row of bits or a cyclically continued diagonal to be accessed simultaneously;

FIG. 5 depicts a memory consisting of multiple subarrays wherein the set of rows with a specific address in all of the subarrays form a product code;

FIG. 6A is a projective plane graph in tree form showing a typical set of bit values satisfying all parity equations defined by the point and line nodes of the graph;

FIG. 6B is a two-sided tree used for the construction of a projective plane graph with parameter $q=2$ showing edge addresses;

FIG. 6C is a projective plane graph with parameter $q=2$ showing the addresses of all of the bits in the graph;

FIG. 7 illustrates mapping a projective plane graph in tree form to a series of subarrays providing storage locations for all of the bits in the graph;

FIG. 8 shows a memory architecture consisting of multiple subarrays with address computers permitting simultaneous access to the sets of bits adjacent to any parity node in a projective plane graph with parameter $q=4$;

FIG. 9 shows row address computers for a projective plane memory with parameter $q=4$;

DETAILED DESCRIPTION OF THE INVENTION AND OF THE PREFERRED EMBODIMENTS

Figures 10A, 10B:
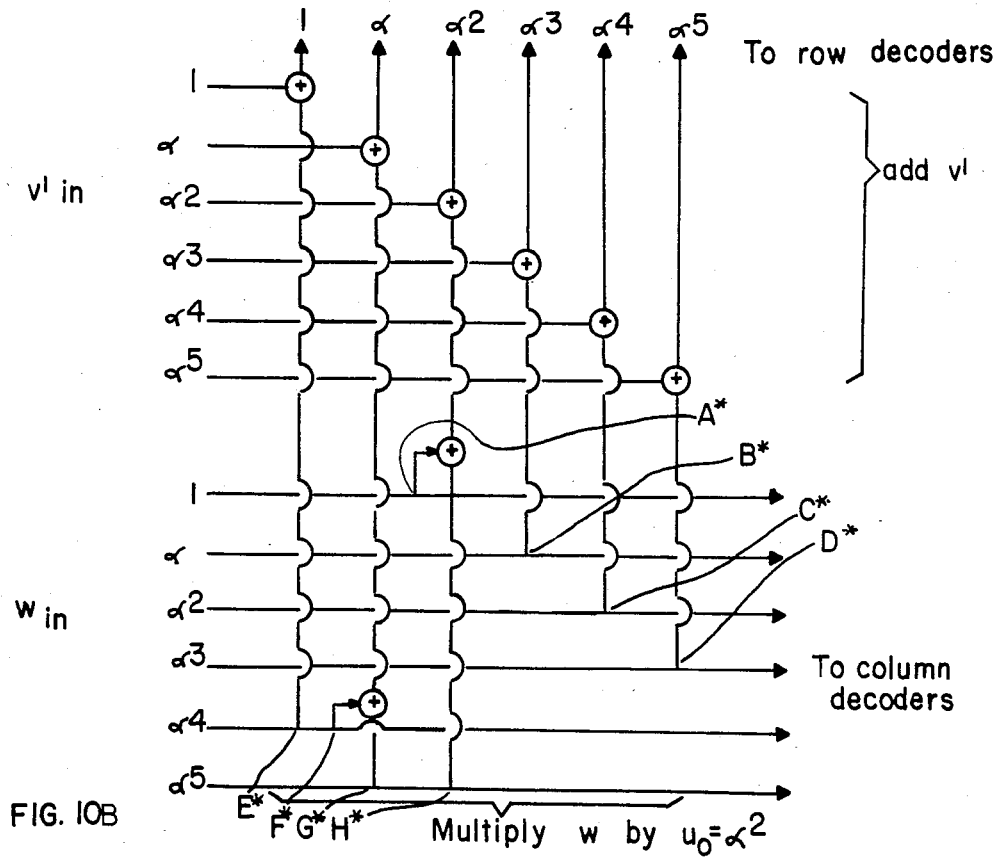
FIG. 10A shows binary matrices for a basis set of elements for the Galois field GF (64)
FIG. 10B shows the row address computer for the $u_0=(0,0,1,0,0,0)$ subarray in a projective plan architecture with parameter $q=64$.

In accordance with this invention, several systems and procedures are provided that achieve high coding efficiency by organizing a memory so that a large number if not all of the stored bits form a single codeword in a large block-length code. This invention is described with one bit as the basic memory unit. However, other basic memory units consisting, for example, of a string of n bits, where n is a selected integer, can also be employed with this invention.

One embodiment of the invention is based on the product code of Elias, P., *Error-free coding*, IRE Trans. Inform. Theory, Vol. PGIT-4, pp. 29–37, September 1954, where the construction can be seen clearly, unobscured by the subtlety of the code itself. In this embodiment the efficiency is exceedingly high—for example, only roughly 1/256 of the memory for a 256K RAM is redundant parity checks—but communication requirements lead to large area penalties with current fabrication techniques. Subsequent embodiments present several modifications of this code which have various trade-offs between coding efficiency, read delay, and complexity of communication and computation. All of these are single error-correcting, double error-detecting codes. Finally, a double error-correcting triple error-detecting graph code and algorithm is disclosed that achieves high coding efficiency at the expense of more complicated addressing. See also the paper by R. M. Tanner entitled, *A Recursive Approach to Low-Complexity Codes,* IEEE Trans. Inform. Theory, Vol. 27, No. 4, September 1981, pp. 533-547.

In the first embodiment, a single error-correcting code is formed from a parity check using the product code construction. A set of binary information bits is used to form a q×1 rectangular array. A parity check bit is added to each row that is the parity sum of the information bits in that row. Then a parity check bit is added to each column that is the parity sum of the bits in that column (See FIG. 1.) The array is then (q+1)×(l+1), with a (q+l+1) parity bits added to the original information bits. The resulting code has minimum distance four, since changing a single information bit requires changing three of the parity bits to maintain all the parity equations.

To correct a single error anywhere in the array, the parities of all of the rows are computed (i.e., for each row the modulo 2 sum of all of the bits in that row is computed), as are the parities of all of the columns. A parity violation in exactly one row and exactly one column indicates an error in the bit in that row and column (i.e., the bit at the intersection of that row and column); more than one row parity violation or more than one column parity violation indicates the presence of multiple errors. Note that this permits any double error to be detected.

Now consider the bits in the array to be the bits stored, for example, in a RAM with the addresses in the array corresponding identically to the physical locations in the RAM. Let the information bits be $b(i,j)$, $i=0,\ldots q-1, j=0,\ldots, l-1,$; the row parity check bits are the bits $b(i,l)$, defined by $$b(i,l) = \sum_{t=0}^{l-1} b(i,t), i = 0, \ldots, q-1$$

and the column parity check bits are defined by $$b(q,j) = \sum_{t=0}^{q-1} b(t,j), j = 0, \ldots, l$$

and wherein the check bit $b(i,l)$ occupies a position at the end of the i-th row in the l-th column, which column contains only row parity check bits, and the check bit $b(q,j)$ occupies a position at the end of the j-th column in the q-th row containing only column parity check bits, and the bit $b(q,l)$ represents the sum of all the information bits in the memory. (Note that $b(q,l)$ is the parity sum of all of the information bits, whether computed as a sum of row parities or a sum of column parities.) Suppose that the values stored in the memory form a codeword in the product code or fail to form a codeword due to at most a single error. To make an error correcting read for bit $b(i,j)$ three values are needed:

$$\sum_{t=0}^{q} b(t,j) + b(i,j), \quad (1.1)$$

$$\sum_{t=0}^{l} b(i,t) + b(i,j), \quad (1.2)$$

and $b(i,j)$ itself, where all sums are mod 2, and where t is a dummy variable used for indexing. The first is the sum of all bits in the column except the bit itself; the second is the sum of all bits in the row except the bit itself. Note that the value (1.1) includes the bit $b(i,j)$ twice. However, because addition is modulo 2, the effect of this bit on the sum is eliminated. This is clear if one realizes that the bit $b(i,j)$ can either be a 0 or a 1. If the bit is binary 0, the sum of two binary 0's is still a binary 0. If the bit is a binary 1, the sum of two binary 1's is also a binary 0, modulo 2. Similarly, the same effect holds for the summation given by value (1.2). By virtue of the parity check conditions, if no errors have occurred all three values will be the same, namely $b(i,j)$. The three sets of bits are disjoint (i.e., the bits in each set are from unique addresses which do not overlap the addresses in the other sets), and a single error can affect at most one of the three. Consequently, if the value output from the memory is the majority vote of these three, it will be correct, and this value can be written into the memory. The value read out for bit b by the majority vote procedure is called the delivered value of b. The presence of a multiple error is detected by a systematic computation of the parity sets that looks for two or more row or two or more column parity violations.

In writing a bit into the memory, the object is to ensure that the memory still contains a codeword (albeit possibly a new codeward) in the product code. The procedure is to update the codeword as a new value is entered. Initially, when the memory is first turned on and before information is stored therein, all bits in the memory are brought up as zero, forming by definition a codeword. To write $b(i,j)$, into the memory, the value in the (i,j)-th location is read out and corrected using the single error correction read procedure. Bits $b(i,l)$, $b(q,j)$ and $b(q,l)$ are also read out. If the new value of $b(i,j)$ agrees with the corrected (delivered) value, the corrected value and $b(i,l)$, $b(q,j)$, and $b(q,l)$ are rewritten into the memory unchanged. If the new value differs from the corrected value, the corrected value and $b(i,l)$, $b(q,j)$ and $b(q,l)$ are complemented and written back into the memory. It is easily verified that the new memory values form a codeword if the original values did, and that no errors are created by this procedure so long as the currently stored value for $b(i,j)$ is read out correctly.

The means for accessing all of the values required for the automatic SEC read procedure consists of row address decoders of well-known design enabling all of the bits stored in the i-th row of the array to be transmitted in parallel along lines to the row sum parity tree and column address decoders enabling all of the bits stored in the j-th column of the array to be transmitted in parallel along lines to the column sum parity tree; the means for accessing the four bits required for the write procedure consist of circuits of well-known design allowing the last bit in the i-th row, $b(i,l)$, and the last bit in the j-th column, $b(q,j)$, and the corner bit in the array, $b(l,q)$, to be read, complemented if the stored value of $b(i,j)$ differs from the value of $b(i,j)$ to be written, and stored again in the array, as shown in FIG. 2A.

The means for making all of the required calculations consist of a parity tree of exclusive-or gates that computes the sum modulo 2 of the bits in the i-th row and adds the value of $b(i,j)$ to cancel it from the sum, a parity tree of exclusive-or gates that computes the sum modulo 2 of the bits in the j-th column and adds the value of $b(i,j)$ to cancel it from the sum, and a majority logic gate that outputs the value 0 or 1 that occurs most frequently on its input lines, as shown in FIG. 2A.

The multiple data error and circuit failure detection procedure first computes all row parity sums and column parity sums, counts the number of parity violations, detects a multiple error condition if (a) the number of parity violations is even but not 0 or 2, or (b) the number of violations is 2 but there is more than one row parity violation or more than one column parity violation, and detects a circuit failure if the number of parity violations is odd.

The embodiment of this code as a fault-tolerant memory is highly efficient. For example, in a 256K memory, only 2(512)+1 parity check bits are needed; approximately 1/257 of the memory is devoted to redundancy. The code array (i.e., memory array) described above is realized directly as a conventional RAM, with the addresses in the array corresponding identically to the physical locations in the RAM. One of the sums represented by expression (1.1) or (1.2) will be easy to compute by taking advantage of the well-known parallel read lines in the actual memory. For instance, if a row address enables an entire row, the parity sum of the row as required by expression (1.1) can be computed by placing a parity tree at the bottom of the array. The desired bit is selected from the enabled row and added to the parity sum of the row. By making the RAM symmetric with respect to rows and columns, an entire column can be read out in parallel to a column parity tree as required by expression (1.2). The desired bit and the outputs of the row parity tree and column parity tree can be fed to a gate to produce the corrected bit value. This embodiment, however, has high communication costs with current semiconductor fabrication techniques. Depending on the particular semiconductor technology employed, providing parallel enables and outputs for both rows and columns can more than double the basic memory cell size.

To write a bit $b(i,j)$ into this memory, the bit as stored must be read using the correction circuit and $b(i,l)$, $b(q,j)$, and $b(q,l)$ must be read out, complemented as necessary, and rewritten. For example, if the memory shown as an array in FIG. 1 is initially entirely zero, and $b(2,1)$ is to be written as one, the current value of $b(2,1)$, namely, zero, is determined by the correcting read. Since the value to be written differs from that stored, the stored values of $b(2,1)$, $b(2,4)$, $b(4,1)$, and $b(4,4)$ are all complemented and rewritten, leaving the memory values as shown in FIG. 1. Since $b(q,l)$ is examined when any bit is written, separate access to it is provided in a manner well known in the semiconductor memory arts. Parallel access to the other three bits is readily available with the symmetric RAM architecture described in FIG. 2A. The basic layout of this memory is shown in FIG. 2 for one example where $q=l=4$; however, it is clear that the above construction applies to arbitrary q and l. Note that in the structure of FIG. 2A, i and j both vary from 0 to 4.

It is useful to introduce the representation of this product code as a graph code. This representation, which is discussed in detail in "A Recursive Approach to Low-Complexity Codes" referred to above, enables the actual code structure to be seen clearly, independent of the particular architectural realization. It serves also to give a unifying perspective on both the product code, the modified product code and the more intricate projective plane code embodied later.

In FIGS. 3A and 3B the array product code is converted into a bipartite graph. A bit in the code is represented by a solid node, a parity check acting on a set of bits by a hollow node connected to the set of bits checked by the particular parity equation. In the product code, each bit is checked by a row parity check and a column parity check, and thus each bit node has degree two reflecting the fact that each bit is used in two parity equations. Each row parity node has degree 1 and each column parity node has degree q reflecting the fact that the column parity equation sums q bits in a given column and each row parity node has degree 1 reflecting the fact that each row parity equation sum the 1 bits in a given row. The graph created by the array can be recognized as a bipartite graph with the row and column nodes in two classes, as shown in FIG. 3B. In FIG. 3C the graph is redrawn in tree form using an arbitrary bit as the root. As will be seen, my invention makes use of the fact that the tree has the same form, no matter which bit is used as root whether an information bit or a parity check bit. When the bit at the top of the tree is to be read from the actual memory, three values are required: the bit itself, the parity sum of its row, and the parity sum of its column. The access paths and addressing of the RAM architecture as shown in block diagram in FIG. 2A permit two actual parity trees to perform the computations for any desired bit. Thus, suppose that bit $b(1,0)$ is to be read out from the memory. The RAM memory address circuitry will read the address of this bit. The value of this bit will then be read out using a sense amplifier of a well-known design. In accordance with this invention, two parity sums will then be calculated. The first parity sum is the sum of the bits in the column in which $b(1,0)$ is located. As shown in FIGS. 3A and 3B, this sum is calculated by adding bits $b(0,0)$, $b(1,0)$, $b(2,0)$, $b(3,0)$, and $b(4,0)$. Note that $b(4,0)$ is the parity bit previously calculated when the information in the first column (comprising bits $b(0,0)$ through bits $b(3,0)$) was first stored in the memory. Thus, the calculation required by equation 1.1 above has now been made. This calculation is represented in the bipartite graph of FIG. 3B by the lines extending from nodes c0 through the bits $b(0,0)$ through $b(4,0)$. In addition, the bits in the row containing bit $b(1,0)$ are also summed. These bits comprise bits $b(1,0)$, $b(1,1)$, $b(1,2)$, $b(1,3)$, and $b(1,4)$. Bit $b(1,4)$ was the row parity bit previously calculated when bits $b(1,0)$ through $b(1,3)$ were stored in this row. This calculation is represented in the bipartite graph of FIG. 3B by the lines from row node R1 extending through the appropriate bits in the row containing $b(1,0)$.

The structure for implementing this operation is shown in schematic block diagram form in FIG. 2A. Each of the blocks shown in FIG. 2A is of a type well known in the semiconductor arts and thus will not be described in detail for simplicity.

In the structure of FIG. 2A, enable circuits 21 and 22 comprise, respectively, row enable circuitry and column enabe circuitry, both of types well known in the semiconductor memory arts. Enable circuit 21, for example, will enable any row selected by the addressing circuit while enable circuit 22 will simultaneously enable any column selected by the addressing circuit. The schematic configuration of the row enable and row readout lines on a typical memory cell and the column readout and column enable lines on the same memory cell as shown in more detail in FIG. 2B. In FIG. 2B memory cell 29 has column enabe line 29a and column readout line 29b and row enable line 29c and readout line 29d. The column enable line 29a also enables each of the other memory cells (not shown in FIG. 2B) arranged in a column with memory cell 29 while the row enable line 29c and enables each of the other memory cells (not shown) arranged in a row with memory cell 29.

The output signals from the column readout lines 29b are taken to select circuit 23. Select circuit 23 selects out from the simultaneously arriving column bits the particular column not accessed. The select circuit 23 does one of either two things with the bit being accessed. It prevents this bit from being summed in the parity tree 24 which sums the bits to provide the sum required by expression (1.1) or it allows the parity tree 24 to sum all the bits in the column and then subtracts out this bit being accessed from the sum to again achieve the result required by expression (1.1). Similarly, select circuit 25 selects out the bit being accessed from the row bits transmitted simultaneously on the row readout lines corresponding to row readout line 29d in FIG. 2B and either allows the parity tree 26 to calculate the sum required by expression (1.2) without the bit being read included, or it subtracts out the bit being accessed from the total sum of all of the bits in the row to achieve the result required by expression (1.2).

The output signals from the parity tree together with the bit b(i,j) being accessed are transmitted to majority gate 28 which selects as the value for bit b(i,j) the value indicated by at least two out of three of the signals transmitted to majority gate 28. Thus, if bit b(i,j) was in error, the value read out of majority gate 28 will be the bit values dictated by the output signals from parity trees 24 and 26 which will be identical and which will represent the originally stored value for the bit b(i,j).

The semiconductor circuits and processing technology for implementing the structure shown in FIGS. 2A and 2B are all well-known in the digital memory design and manufacturing arts and thus will not be described in further detail.

Returning now to the bipartite graph of FIG. 3B, the minimum distance of the code is one-half of the girth, or minimum cycle length, of the graph. Minimum cycle length is a concept well-known in graph theory. Thus, minimum cycle length is defined as the number of nodes which one must travel, starting at a given node which must be traversed in order to return to the starting node without travelling over the same line more than once. To keep all the parity equations satisfied, a minimum weight word must form a cycle in the graph. The product code graph has girth 8, with a minimum cycle passing through $8/2=4$ bits. To change any single bit in the code (i.e., any bit stored in the memory of FIG. 3A) while preserving all code equations requires that at least four bits (the bit being changed, the row parity bit, the column parity bit and b(q,l)) must be changed. The suggested write procedure in accordance with this invention operates on a minimal set (i.e., does not change more than four bits).

While the tree of FIG. 3C can represent the graph with an arbitrary bit at the root, additional insight into the code structure can be obtained by thinking of the bits at the bottom of the tree (i.e., the bits at the bottom of the graph of FIG. 3C) as the information bits and the root as the bit b(q,l). If an information bit is changed, the bit on the path up the left side of the tree from that bit to the root must be changed, the bit on the path up the right side must be changed, and the root bit must be changed. It is clear, however, that the bits at the bottom of the tree can be assigned arbitrary values and all parity equations can be satisfied by proper choice of the bits at the next level and the root. No matter how the root is approached it will have the same value.

A second embodiment of the invention reduces the area penalty associated with simultaneous readout of rows and columns as described above in conjunction with FIGS 2A and 2B and maintains the coding efficiency by time multiplexing the output lines, thereby increasing the read delay. The second embodiment reinterprets the above graph as the graph of a modified product code in a RAM, for one example.

Taking $q=1$, the $(q+)^2$ bits are organized into a square $(q+1)\times(q+1)$ array as before, and the condition that the mod 2 sum of the bits in any row must be zero is imposed. Note that this is possible because each row contains information bits plus one parity bit. Then, rather than requiring that each column sum to zero mod 2, we demand that the sum along any cyclic diagonal (see FIG. 4 where each cyclic diagonal is defined by one of five uniquely drawn lines) be zero:

$$\sum_{k=0}^{q} b(i-k,k) = 0, \text{ for all } i,$$

where the sum is mod 2 and the index arithmetic is mod $(q+1)$. The i-th diagonal sum and the j-th row share exactly one bit, and thus the code is isomorphic to the original code. Once again we can take the bits b(i,j), $i,j=0, \ldots, q-1$ to be the information bits. The bits b(i,q), $i=0, \ldots, q-1$ are determined by the row sums, and then the bits b(q,j), $j=0, \ldots, q$ are determined by the diagonal sums and stored as before. To write bit b(i,j) into the memory while preserving the memory as a single codeword, bits b(q,i), b(i,q), and b(q,i+j+1) must be accessed.

To read a bit, the bit has to be accessed along with a corresponding row sum and a diagonal sum. As before, with a row enable and a parity tree at the bottom of the memory, for example a RAM, both the bit and the row sum plus b(i,j) can be obtained in a first cycle. The bits in the i-th row are transmitted in parallel along lines to the parity tree at the bottom of the row. As the i-th row enters the parity tree, a column address decoder can select from it the bit b(i,j) and the row sum parity check bit b(i,q) required by expression (1.2) above can be obtained for the write procedure. To obtain the diagonal sum, the diagonal address $(i+j+1)$ mod $q+1$ is computed using techniques well known in the art. For example, as shown in FIG. 4, only one parity tree 44 is required to calculate both the row parity check bit and the column parity check bit by using the row sum and a diagonal sum. Thus, diagonal enable circuit 41 enables the memory cells in selected diagonal as illustrated by a unique line in FIG. 41 to thereby allow the bits stored in each of the cells on the particularly identified diagonal to be read to seect circuitry 43. Select circuitry 43 selects out the bit b(i,j) being accessed and then allows parity tree 44 to calculate the diagonal sum in a manner analogous to that used in accordance with expression (1.1) for the column parity bit. However, it should be noted that the bits used to calculate a diagonal parity are selected from the diagonal containing the particular bit b(i,j) being accessed. The parity tree calculates the parity without bit b(i,j) or calculates the parity including this bit and then subtracts this bit from the total. Following this calculation, the row enable circuit 42 enables the row containing bit b(i,j). This row is then transmitted to select circuitry 43 which either deselects the bit being accessed b(i,j) thereby allowing parity tree 44 to calculate the sum of the bits in the selected row absent the bit b(i,j) or retains bit b(i,j) to be later added or subtracted to the sum calculated by parity tree 44 from all the bits in the selected row. The resulting sum from the parity tree is transmitted to majority gate 46 together with the previously calculated row sum retained in memory 45 (which typically comprises merely a flip-flop set to hold either a binary 1 or a 0) simultaneously with the bit b(i,j) from select circuit 43. Majority gate 46 then again produces an output bit representative of at least two of the three input signals to it. Should b(i,j) be an error, majority gate 46 will produce an output signal representing the value of the inputs from the row sum and the diagonal sum operations which values will be identical. Consequently, the circuitry corrects for a single error in the bit b(i,j). The circuitry of FIG. 4 has significant economies in that one select circuit 43 and one parity tree circuit 44 to calculate two parity sums are required instead of the two such structures as shown in FIG. 2A. Thus, the circuitry of FIG. 4 operates in two cycles. During the first cycle, the row sum is calculated and stored in memory 45. During a second cycle, this diagonal address is transmitted to diagonal address decoders that activate the entire cyclically continued diagonal. The same parallel output lines carry the values from the diagonal to the parity tree of exclusive-or gates at the bottom of the array which at that time computes the diagonal parity sum plus b(i,j). The diagonal address aso selects from that diagonal the diagonal check bit b(q, (i+j+1) mod q+1), located where the diagonal passing through b(i,j) passes through the q-th row, for the write procedure. (Similarly, for the write procedure the address i selects the diagonal parity bit b(q,i) from the bottom row of the array.) The row parity sum computed and temporarily stored during the first cycle, the bit value and the diagonal parity sum computed during the second cycle are transmitted to the majority gate which produces the corrected value, namely the value of 0 or 1 that occurs most frequently on its input line.

The multiple data error and circuit failure detection procedure first computes all row parity sums and diagonal parity sums, counts the number of parity violations, detects a multiple error condition if
 (a) the number of parity violations is even but not 0 or 2, or
 (b) the number of violations is 2 but there is more than 1 row parity violation or more than one diagonal parity violation, and detects a circuit failure if the number of parity violations is odd.

This architecture is described in FIG. 4.

The main advantage of this architecture is that only row enable and row readout lines are required to read the values of each of the rows and to read the values of the signals stored in each of the diagonals. A diagonal enable must be formed on the chip to allow each of the memory cells in a given diagonal to be simultaneously enabled. However, the readout of the bits stored in each of the diagonal cells is then made using the row readout line associated with that cell.

The need for multiplexing of the output lines arose beoause a large set of bits had to be accessed to perform a single error-correcting read for any one bit. This communication bottleneck can be alleviated by reducing the coding efficiency. Clearly in the normal RAM semiconductor architecture, all the bits in a given row are readily accessed. This suggests the use of a encoding in which all the bits required to decode a given bit are found in a single row. While any error-correcting code could be used, the simplicity of the computations for both encoding and decoding the product of parity check codes make it an attractive candidate. Consider, then, converting each of l matrices, each matrix of dimension $(q+1)\times(q'+1)$, each of which is organized as a product code, into a single RAM row by concatenating the successive rows of each product code. The coding efficiency is greatest when q and q' are large, and thus for the sake of coding efficiency, it would be preferable to have a highly rectangular $1\times(qq'+q+q'+1)$ RAM. To preserve the aspect ratio of the RAM in our third embodiment of the invention, we instead concatenate $q+1$ subarrays each of dimension $1\times(q'+1)$. The bits are indexed by b(u,v,w), where u gives the subarray, v gives the row in the subarray, and w gives the column in the subarray and the set of bits with a fixed v form a product code with u indexing the product code rows and w the product code columns. This organization is shown in FIG. 5 for q=4, l=5, q'=4.

To calculate the product code row sum for a particular bit b(u,v,w), the row sum of the v row of the u subarray must be accessed. This can be achieved by having a parity tree 52-0 through 52-4 associated with each subarray and the u address u=0 through u=4 selects the appropriate parity tree output to be used. The product code column sum is the sum over u of the bits in all the subarrays with the same v and w addresses. The addresses v and w are used to select a single column bit from each of the subarrays; these are fed into a parity tree comprising adders 53-0 through 53-4 spanning the subarrays that produces the required sum.

In more detail, the memory is in the form of a series of $q+1$ rectangular arrays having a natural addressing wherein the (v,w) position in the u-th array is occupied by the information bit b(u,v,w) for u=0, ..., q−1, v=0,1, ..., (l−1), w=0,1, ..., q'−1. (Note that the product code does not have to be square.)

The code consists of a series of independent product codes generated by defining check bits in the u=q subarray and the w=q' columns by the parity check equations $$\sum_{k=0}^{q'} b(u,v,k) = 0 \text{ for } u = 0, \ldots, q, \text{ and } v = 0, \ldots, l-1 \quad (A)$$

so that a bit in the q-th column of a subarray is the sum modulo 2 of the other bits in the same row and subarray;

$$\sum_{k=0}^{q} b(k,v,w) = 0 \text{ for } v = 0, \ldots, l-1, \text{ and } w = 0, \ldots, q' \quad (B)$$

so that the bit b(q,v,w) is the modulo two sum of all of the bits in the same row and column in all of the u subarrays for u not equal to q and wherein the check bits b(q,v,w) for v=0, ..., l−1, w=0, ..., q'−1 so defined are stored in the u=q subarray and the check bits b(u,v,q') are stored in the q'-th column of the u-th subarray as shown in FIG. 5.

The stored values required for the automatic SEC read procedure for the bit $b(u,v,w)$ are (A) the bit $b(u,v,w)$         (3.1)

(B) $\sum_{k=0}^{q'} b(u,v,k) + b(u,v,w)$ the sum modulo two of all other bits in the same subarray and row, and (C) $\sum_{k=0}^{q} b(k,v,w) + b(u,v,w)$         (3.2)

the sum modulo two of all other bits in the same row and column in the other subarrays.

The stored values required for the write procedure are
- (A) $b(u,v,w)$
- (B) $b(u,v,q')$
- (C) $b(q,v,w)$
- (D) $b(q,v,q')$ The means for accessing all of the values required for the SEC read procedure consist of addressing lines selecting the bit $b(u,v,w)$ from the u-th subarray and the output from the parity tree associated with the u-th subarray and the bit $b(k,v,w)$ from the k-th subarray for each k to be fed into a parity tree with one input from each subarray. The means for accessing all of the values required for the write procedure consist of addressing lines selecting bit $b(u,v,w)$ and bit $b(u,v,q')$ from the v-th row of the u-th subarray and bit $b(q,v,w)$ and bit $b(q,v,q')$ from the v-th row of the u=q subarray to be complemented and rewritten to their respective locations when the stored value as corrected of $b(u,v,w)$ differs from the value to be written.

The means for making all of the required calculations comprise a parity tree such as tree 52-u of exclusive-or gates associated with the u-th subarray for each u=0,1, ..., q that computes the sum modulo 2 of the bits in a row of that subarray plus $b(u,v,w)$, a parity tree comprising adders 53-0 through 53-4 with one input from each of the q subarrays that computes the modulo 2 sum of single bits in the column in the product code containing $b(u,v,w)$ selected from each of the subarrays plus $b(u,v,w)$, and a majority logic gate 54 that outputs the value 0 or 1 that occurs most frequently on its input lines, as described in FIG. 5.

As described above in conjunction with the embodiment shown in FIGS. 3A, 3B, and 3C, a multiple data error and circuit failure detection procedure can also be employed using the structure of this invention. This procedure allows one to determine whether or not the memory circuit has failed as well as detecting whether or not any bit in the circuit is in error and, if so, correcting that bit.

The multiple data error and circuit failure detection procedure first computes the row parity sums for the v-th row of each of the q subarrays and the parity sum of all bits in the v-th row and w-th column of every subarray, one sum for each w, counts the number of parity violations, detects a multiple error condition if
 (a) the number of parity violations is even but not 0 or 2, or
 (b) the number of violations is 2 but there is more than 1 row parity violation or more than one w with parity violation, and detects a circuit failure if the number of parity violations is odd. This is because an error in any one bit being read causes two parity errors and thus a single parity can only be indicative of a circuit failure. This procedure can be repeated for each v.

For a fixed memory size, this organization into multiple, independent product code blocks decreases the coding efficiency. Using this approach to implement a 256K memory, we have $q'=q=1=64$ and $64(2(64)+1)$ parities. The efficiency is that of the $64 \times 64$ product code, with roughly 1/33 of the memory devoted to parities. Nonetheless, the greatest area penalty is still not the storage for the parities; rather it is in providing the separate sense amplifiers for the separate subarrays and the parity trees. Note, however, that an entire column of one of the subarrays can fail without causing failure of the memory, assuming no other errors are present, because any column contributes at most one bit to the output sum.

In the next embodiment, separate row addressing and address computers are used with each of the subarrays, the memory is reintegrated to form a single codeword in a graph code derived from a projective geometry. The fraction of the memory devoted to parity check bits is virtually unchanged compared to the embodiment shown in FIG. 5. Similar parity trees enable single error correction to take place at the time a bit is read. The code has minimum distance six, and is capable of performing double error correction.

As discussed in "A Recursive Approach to Low-Complexity Codes," referred to above, a projective geometry PG(2, q) as described by Cameron, P. J. and Van Lint, J. H., in *Graph Theory, Coding Theory, and Block Designs,* Cambridge, Cambridge Univ. Press, 1975, can be used to construct a field plane hexagon code for any prime power q. By letting the points and lines represent parity checks and creating a bit node for every point-line pair, a bipartite graph is formed that has girth, or minimum cycle, of twelve. In such a graph, any bit node can be used as the root of a graph in tree form analogous to that of FIG. 3C where no cycles are formed above depth 6. A graph of this type for $q=2$ is shown in FIG. 6A. Presently, we will construct the graph by starting from an actual tree and connecting the leaf edges at the bottom on one side of the tree to the leaf edges on the other side so as to guarantee that the graph thus formed has a minimum cycle of twelve.

Once the graph has been constructed, its implementation and use as a RAM, for example, are extensions of the techniques for the product code. Note, for example, that there are $q^3$ bit nodes (i.e., eight bit nodes with $q=2$) at the bottom of the graph in tree form. These bottom nodes can be taken to be the actual data bits, with those higher in the graph being the parity checks. If the $q^3$ bits at the bottom of the graph in tree form are assigned arbitrary values, all of the parity equations can be satisfied by proper choice of the values of the remaining bits. The code is thus a $[(q+1)(q^2+q+1),q^3,6]$ code. This can be seen by considering the graph in tree form of FIG. 6A where typical values have been assigned to the information bits at depth 6. All of the parity equations represented by the nodes at depth 5 can be satisfied by letting each bit at depth 4 be the modulo 2 sum of all of the bits at depth 6 attached to the parity node at depth 5 below and connected to the bit at depth 4 as shown in FIG. 6A. Similarly, the parity equations represented by the nodes at depth 3 can be satisfied by letting each bit at depth 2 be equal to the sum of the bits at depth 4 connected to the node at depth 3 attached to the bit at depth 2. Finally, both parity equations at depth one are satisfied by letting the top bit at depth 0 be the parity of the left and right sets, which must be the same value, namely, the modulo 2 sum of the eight bits at depth 6 at the bottom of the tree.

The code is, surprisingly, a circuit code. Abstract circuit codes are described by Peterson, W. W., and Weldon, E. J., *Error-Correcting Codes*, Cambridge, Mass. MIT Press, 1972, and by Huffman, D. A., Graph Codes, unpublished paper, 1966. The tree forms a spanning tree, and thus is sufficient to establish the parity checks. I have discovered that a graph code based on a projective plane can be used as the basis for a memory architecture with significant advantages. In particular such a memory can achieve double error correction and triple error detection.

To construct a projective plane graph for an arbitrary q that is a prime power, we start from a two-sided tree such as the one shown for q=2 in FIG. 6B. On the left side at the top is placed a line node (denoted by a hollow box), on the right side at the top a point node (denoted by a hollow circle), and the two nodes are connected by an edge. From the line node on the left q edges downward are added, each terminated by a new point node and each indexed by an element of the Galois field GF(q). (When q=2, the field elements are 0 and 1. From the point node on the right, q edges downward are added, each terminated by a new line node and each indexed by an element of the field GF(q). Similarly, from each point node just constructed on the left a set of q new edges terminated by line nodes and indexed by filed elements is added. Correspondingly, from each line node just constructed on the right a set of q new edges terminated by point nodes and indexed by field elements is added. The two-sided tree now has three levels of nodes of alternating type, point and line, on each side. From each of the bottom line nodes on the left q new edges are added downward, each indexed by a field element, but these edges are not terminated in new nodes. Note that these new edges can be viewed as being indexed by three-tuples of elements from GF(q), the three-tuple for a particular edge defined by the successive indexes of the edges that must be followed down the left side of the tree to reach that edge. The three-tuple for an edge on the bottom of the left side is given by (u,v,w). In like manner, q new edges are added to each node on the bottom of the right side of the tree, and these edges are indexed by [x,y,z] as defined by the edge indexes along the path to the bottom edge down the right side of the tree.

This tree is transformed into a graph by connecting each edge on the bottom of the tree on the left to a unique edge on the bottom of the tree on the right. Once these connections are made, the graph is converted into a code graph by inserting a bit node in the middle of each of the edges in the graph and using both the point nodes and lines nodes of the graph as parity nodes. The connections are defined by giving a function f mapping the address of an edge on the bottom left to the address of an edge on the bottom right. After bit nodes are introduced into these newly connected edges, the edge addresses effectively provide two different addresses for those bits. We will explicitly describe the connections by giving the function f relating the two different addresses for the bits at the bottom of the graph in tree form.

The left side of the tree provides a naturally q-ary addressing of the bottom bits and the right side provides a different q-ary addressing. By employing a (q+1)-st symbol $\Phi$, we can give addresses to all of the bits in the tree in the form of 3-tuples on a (q+1)-ary alphabet. For addresses via the left half, the 3-tuples will be given in parentheses. For addresses via the right half, the 3-tuples will be in square brackets. The bit at the top is $(\Phi,\Phi,\Phi)=[\Phi,\Phi,\Phi]$. The bits at depth 2 on the left are $(u,\Phi,\Phi)$. Those at depth 4 are $(u,v,\Phi)$ and the bottom bits as addressed via the left tree are $(u,v,w)$. Similary on the right, the bits are $[x,\Phi,\Phi]$ at depth 2, $[x,y,\Phi]$ at depth 4, and $[x,y,z]$ at the bottom. The address components u,v,w,x,y and z can all be interpreted as elements of GF(q).

The linkage between the left and right halves of the tree formed by a data bit at the bottom can be represented by an address mapping $f:(u,v,w) \to [x,y,z]$ such that the address of a bit via the left half is $(u,v,w)$ and its address via the right half is $[f(u,v,w)]$. In these terms, the code has minimum distance six by selecting the mapping f so that no cycles of less than 12 exist in the graph.

This can always be done. For example, if the address mapping is given by $f(u,v,w)=x,y,z]=[w,v-uw,u]$, with arithmetic on GF(q), the graph has no cycles shorter than 12.

This may be seen as follows:

The mapping f is clearly a bijection (i.e., a one-to-one mapping). Also, it is easy to see that any cycle must have length 4,8, or 12, because the graph is doubly bipartite: line nodes connect via bit nodes only to point nodes, not other line nodes, and vice versa. No short cycle of 4 or 8 can pass through the root node, nor can one pass through a parity node at depth 1. If there is a short cycle that passes through a parity node at depth 3 on the right side, it must pass through a single parity node at depth 5 on the left. However, any pair of bits with addresses $(u_0,v_0,w_0)$ and $(u_0,v_0,w_1)$, $w_0 \neq w_1$, have different x addresses on the right, and so such a cycle must pass through the parity node at depth one on the right. This implies that it has length 12 or greater. Similarly, no short cycle can pass through a single parity node at depth 5 on the right. The only remaining possibility is that there is a short cycle confined to nodes at depths five and six. If so, this short cycle must pass through four bits with left and right addresses of the form.

| Left Address | Right Address |
| --- | --- |
| $(u_0,v_0,w_0)$ | $[x_0,y_0,z_1]$ |
| $(u_0,v_0,w_1)$ | $[x_1,y_1,z_2]$ |
| $(u_1,v_1,w_2)$ | $[x_1,y_1,z_3]$ |
| $(u_1,v_1,w_3)$ | $[x_0,y_0,z_0]$ |

By definition of f, this implies that $w_1=w_2=x_1$, $w_0=w_3=x_0$, $z_1=z_2=u_0$, and $z_0=z_3=u_1$. Then $y_1=v_0-u_0w_1=v_1-u_1w_1$ and $y_0=v_0-u_0w_0=v_1-u_1w_0$. Consequently, $$v_0 - v_1 = w_1(u_0 - u_1)$$
$$= w_0(u_0 - u_1)$$

Since these are elements of a field and non-zero elements have multiplicative inverses, this implies that either $u_0=u_1$ or $w_0=w_1$, a contradiction. Therefore no such cycle can exist and the graph has girth 12.

This mapping for $q=2$ has been used in FIG. 6C. Of course, any equivalent function, i.e., one having the property that the minimum cycle length in the associated graph is twelve, could be used in the construction of a graph.

For this code, the object of the procedure for writing into the memory consists of updating the stored values so that the memory always forms a codeword. If the memory is brought up when power is turned on with all bits set to 0 or can be reset so that all bits are 0, it clearly forms a correct codeword. To write a data bit, that bit as stored is read out of the memory along with the five other bits on the two paths from that bit to the top of the tree, including the bit at the top (the bits are represented in FIG. 6C by the solid circular black dots. If the value to be written is the same as the one read out, all six bits can be written back in unchanged. If the new value is different, all six values are complemented and then written back in. The memory addressing arrangement (to be discussed later) permits all six of these bits to be accessed and written in parallel.

For this write procedure to function properly, the value read out must be correct. Otherwise, the complementing operation may itself create errors among the parity bits that can engender future read errors. Consequently, the value read out must be that provided by the error-correcting read procedure either the single-error correcting, or, for additional protection, the software double error-correcting procedure to be discussed later.

Reading with single error-correction is, likewise, analogous to the procedure for the product code. Referring to FIG. 6A, if no errors have occurred, the parity sum of the bits at depth 2 in the left half of the tree and the parity sum of bits at depth 2 in the right half both are the same as the value of the bit at the top of the tree. A majority vote of these three will give the correct value so long as at most a single error has occurred. The RAM organization in accordance with this invention makes these three values available for any bit read.

The underlying code has minimum distance six and is thus capable of correcting double errors and detecting three or more errors. The tree algorithm of Tanner, R. M., *A Recursive Approach to Low-Complexity Codes,* IEEE Trans. Inform. Theory, Vol. 27, No. 4, September 1981, pp. 533-547, can be used for this purpose, and we will now show how it can be adapted to the memory context. To carry out the full double error correction procedure in hardware each time a bit is read would increase access delay and require substantial additional circuitry; a software implementation included in the system management program in combination with the memory and its access circuitry may be more appropriate. For example, this software might be incorporated naturally into the refresh program for a dynamic memory.

Given that the graph has girth twelve, any bit in the graph can be used as the root of a graph in tree form given in FIG. 6A. The value of the bit at the top of the tree can be recaptured correctly despite the presence of two errors using a two stage procedure. In the first stage, the sum modulo 2 of all of the bits connected to each of the parity nodes at depth three is computed. If any one of these is not zero, indicating a parity violation, an "X", representing an uncertain value, is placed on the bit node at depth two adjacent to that parity node. In the second stage, the values of the bits at depth two (zero, one, or "X") are used to produce two estimates for the value of the bit at the top of the tree. The sum modulo 2 of all of the bits at depth two in the left half of the tree is computed. If any one of those bits has a value "X", the sum is considered to be "X" as well. This sum is one estimate for the value of the bit at the top of the tree. Likewise, the sum modulo 2 of all of the bits at depth two in the right half of the tree is computed. If any one of those bits has a value "X", the sum is considered to be "X" as well. This sum is the other estimate for the value of the bit at the top of the tree. Three values, then, are available at the top node: an estimate from the left side, an estimate from the right side, and the stored value of the bit itself. To make a final decision on the top bit's value, an estimate of 0 or 1 is given a weight of 2. An estimate of "X" is given no weight. The value of 0 or 1 stored for the bit is given weight one. The value with the largest total weight is the answer. Thus conflicting 0 and 1 estimates will be decided by the stored value. One estimate of "X" and a conflict between the stored value and the other estimate goes in favor of the estimate. Two "X"'s and a stored value gives the stored value, and so forth.

While the above description uses the notion of a value "X", the hardware does not actually need to provide a nonbinary value. If a parity violation is discovered at one of the parity nodes at depth three in the graph, the estimate coming from that side of the tree is always "X", which is given no weight. A software double-error correction procedure can determine the presence of such a parity violation by using the single error correction read procedure to read all of the bits at depth two. The lines into the majority logic gate indicate whether there is a parity violation. These are made available externally for use by the software double-error correction procedure.

If no errors are present, the final decision will have the total weight of five (two from the left, two from the right and one from the bit at the top) for the correct value, and it is straightforward to check that a single error anywhere in the tree can cause a change in the final weight of at most two. Consequently, the final bit value will be correct so long as two or fewer errors have occurred. This final bit value is written into the memory if memory correction is desired.

Before considering the details of carrying out this procedure, we describe the actual hardware, showing how the tree used to create the projective plane can be realized as a semiconductor memory such as a RAM.

The starting point for the physical organization of the memory is the addressing given by the left side of the tree. The data bits are stored in q subarrays, each with q rows and q columns. The subarrays are indexed by u, the rows by v, and the column within a subarray by w. The parity bits at depth 4 on the left side can be stored as an extra column in each u subarray. This is the form shown in FIG. 7, where the two main subarrays, $u=0$ and $u=1$, each containing four bits of information, have an extra third column. The parity bits at depth two on the left are an additional bit associated with each u subarray, the (u, $\Phi$, $\Phi$) bit.

When a bit with address $(u_0,v_0,w_0)$, denoted by $b(u_0,v_0,w_0)$, is read, the correction procedure previously described requires the bit itself and two parity sums:

$$b(u_0,v_0,\Phi) + \sum_{w=0}^{q-1} b(u_0,v_0,w) + b(u_0,v_0,w_0) \quad (4.1)$$

and $$b[x_0,y_0,\Phi] + \sum_{z=0}^{q-1} b[x_0,y_0,z] + b[x_0,y_0,z_0] \quad (4.2)$$

where $f(u_0,v_0,w_0)=[x_0,y_0,z_0]$ and the sums are mod 2. The first sum is straightforward. It is the exclusive-or sum of the entire $v_0$ row of the $u_0$ subarray, including the extra $(u_0,v_0,\Phi)$ bit, exclusive-or'd with the bit value itself. The bit value itself is added simply to cancel out its presence in the row sum. The second sum is less obvious, but note that $$\sum_{z=0}^{q-1} b[x_0,y_0,z] = \sum_{u=0}^{q-1} b(u,v'_0 + uw_0,w_0)$$

with $v'_0=(v_0-u_0w_0)$. The bit $b[x_0,y_0,\Phi]$ can be viewed as a bit in another special subarray for the right side of the tree with elements indexed by $x_0$ and $y_0$ or, equivalently, $v'_0$, and $w_0$. This will be referred to as the $(\Phi,v',w)$ subarray, shown as the $u=\Phi$ array in FIG. 7. Similarly, the bits with addresses of the form $[x,\Phi,\Phi]$ can be stored in a $(\Phi,\Phi,w)$ column appended to the $u=\Phi$ subarray. The top $(\Phi,\Phi,\Phi)$ bit is the extra bit for that subarray. The sum (4.2) is the exclusive-or sum of one bit from each main subarray, one bit from the $(\Phi,v',w)$ subarray, and the bit itself. As before, the bit value itself is added back in to cause it to disappear from the final sum.

The computation of memory addresses on a Galois field is a novel feature of this invention. Therefore, this feature together with the parallel parity computation are described in detail below.

In FIG. 8, a schematic diagram of the memory for $q=4$ is given. When a bit is read, the input address is divided into three parts, u, v', and w. To facilitate address computation, the external address for a bit with internal address (u,v,w) is (u,v'=v-uw,w). Of course, this makes no difference to the user. Each of the q different subarrays has a row-address computer 81 that receives as input both v' and w and computes, using its own unique value of u, $u_0$, the row address for that subarray, $v'+u_0w$. The multiplication is just multiplication by a constant on the field and is tantamount to a matrix multiplication over the base field as described in Berlekamp, E. R., *Algebraic Coding Theory*, McGraw-Hill, 1968, pp. 44–51.

For example, GF($2^2$) is generated by the primitive irreducible polynomial $\alpha^2+\alpha+1=0$. Elements of GF ($2^2$) can be represented as polymonials in $\alpha$: 0, 1, $\alpha$, $1+\alpha$, or by coefficient vectors [0,0], [1,0], [0,1] and [1,1], respectively.

The row address computer for the array $u_0$ must compute $v'+u_0$ w from incoming v' and w lines. The lines also are coefficients of polynomials v' and w. If $u_0=u_{00}+u_{01}\alpha=[u_{00}, u_{01}]$ and $w=[w_0,w_1]=w_0+w_1\alpha$, then in general $u_0\cdot w=(u_{00}w_0)+(u_{00}w_1+u_{01}w_0)$ $\alpha+(u_{01}w_1)\alpha^2$. Then $\alpha^2=\alpha+1$ gives $$u_0\cdot w=(u_{00}w_0+u_{01}w_1)+(u_{00}w_1+u_{01}w_0+u_{01}w_1)\alpha.$$

For fixed $u_0$ this is linear and can therefore be represented by a matrix $$y = u_0w = [w_0,w_1]\begin{bmatrix} u_{00} \; u_{01} \\ u_{01} \; u_{00}+u_{01} \end{bmatrix} = [y_0,y_1]$$

The realization for the four different $u_0$ are shown in FIG. 9. The addition of v' and y is the bit-wise exclusive or of two two-bit vectors as shown in FIG. 9. The $u_0=\Phi$ subarray just gives w to the row and v' to the column select 85. For the embodiment where q=64, the addition is a bit-wise exclusive-or of two six bit vectors. The entire computation for one subarray can be carried out with six multiple-input exclusive-or gates. Each of the subarrays has a (q+1)-input exclusive-or tree 82 that computes the mode 2 sum of the bits in the row specified by the computed row address. The w address selects a bit from that row. The last bit in the row is the (u,v', $\Phi$) bit for that $u_0$.

For q=64, one can use, for example, the primitive irreducible polynomial $\alpha^6+\alpha+1=0$. The field elements are now 6-tuples $$w = [w_0, w_1, w_2, w_3, w_4, w_5]$$
$$= w_0 + w_1\alpha + w_2\alpha^2 + w_3\alpha^3 + w_4\alpha^4 + w_5\alpha^5$$

All the matrices for the 64 $u_0$'s are sums of the matrices for $u_0=1$, $u_0=\alpha$, $u_0=\alpha^3$, $u_0=\alpha^4$, $u_0=\alpha^5$, given in FIG. 10A.

The matrices determine the exclusive-or connections. For example for the $u_0=\alpha^2$ subarray, the row address computer is given in FIG. 10B.

Notice how the exclusive-or connections A*, B*, ..., H* in FIG. 10B are the images of the matrix entries A, B, ... H.

To obtain a matrix for another $u_0$, the matrices for the powers of $\alpha$ present are added. For example, for $u=[1,0,0,1,0,1]=1+\alpha^3+\alpha^5$, the matrices for 1, $\alpha^3$, and $\alpha^5$ are added, as shown in FIG. 11A.

Figures 11A, 11B:
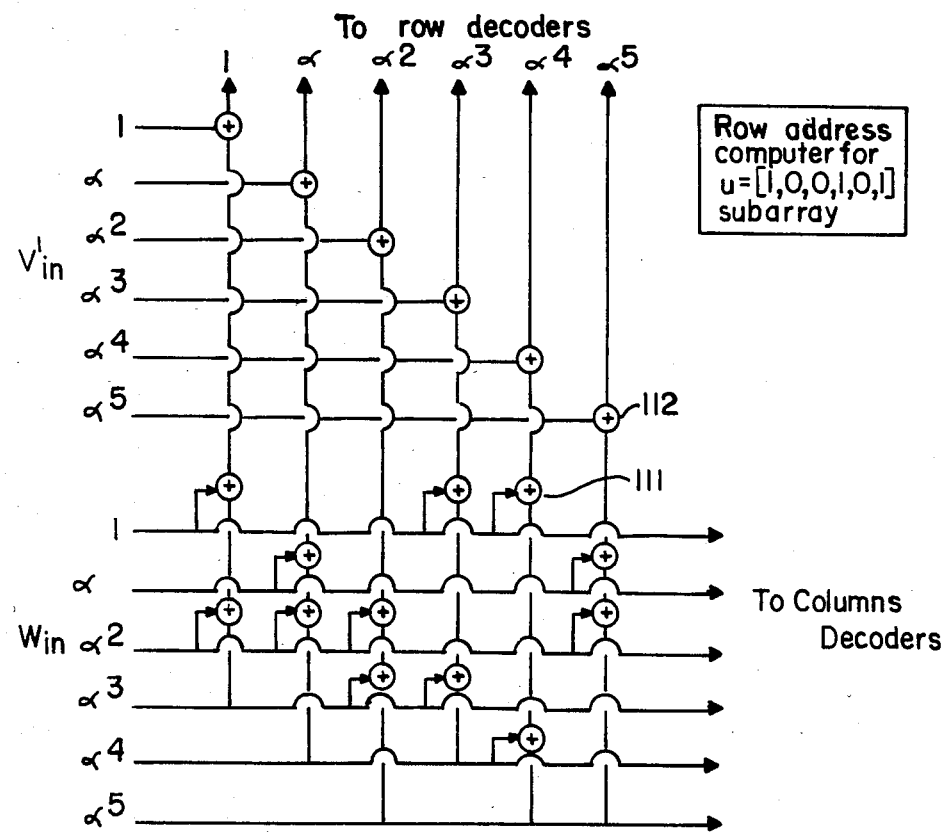
FIG. 11A shows the creation of the binary matrix for $u=(1,0,0,1,0,1)$ on GF(64) by addition of the binary matrices for the basis elements $u=(1,0,0,0,0,0)$, $u=(0,0,0,1,0,0)$, and $u=(0,0,0,0,0,1)$.
FIG. 11B illustrates a row address computer for the array $u=(1,0,0,1,0,1)$ in a projective plane architecture with parameter $q=64$.

The corresponding row address computer is shown in FIG. 11B. The exclusive-or elements are shown by the structures such as element 111 in FIG. 11B.

This is a row address computer of "typical" complexity: Approximately 12 exclusive-or's are used, as shown, for the constant multiply and 6 adders such as adder 112 are used for the vector add. The structure shown serves an array with (65×64) +1 bits.

Other primitive irreducible polynominals could be used to generate the field and would give different, but functionaly equivalent, row address computers.

The sum [4.1] is produced by letting the u address select a particular subarray. The w-selected bit of that subarray is the desired data bit and is placed on an output line. The output of the exclusive-or tree for that subarray is the first two terms of [4.1] and it is placed on a line leading to the "w sum out." The actual "w sum out", [4.1], is the exclusive-or of this with the selected bit.

The sum [4.2] is formed by another (q+1)-input exclusive-or tree that combines the w-selected bits from each of the q subarrays and the bit from the w row and v' column of the ($\Phi$, v', w) additional subarray. The actual (u, v, w) bit is exclusive-or'd with this to give [4.2].

For the purposes of the write operation, the previously mentioned six bits (five parity bits plus one information bit) must be accessed. The first of these is the desired bit itself. The second is the bit in the extra column and same row of the u-selected subarray. The third is the extra bit for that subarray. The $(\Phi, v', w)$ bit and the $(\Phi,\Phi,w)$ bit are in the same row of the $u=\Phi$ subarray. The sixth is the extra $(\Phi,\Phi,\Phi)$ bit for that subarray, as shown in FIG. 7. The hardware as shown in schematic block diagram form in FIG. 8 permits these to be written back in parallel, since two bits from any subarray are always taken from the same row.

A review of FIG. 5 which represents the memory organization for the independent product codes, and FIG. 8, that for the projective plane code, reveals that they closely resemble each other. The key difference is that the single bits taken from each of the subarrays by the projective plane can all be in different rows. This creates an interdependence between the rows that is not present in the independent product code organization of FIG. 5 and enables the projective plane code to correct double errors. The price that must correspondingly be paid is that individual row addresses must be computed for each of the subarrays, and each subarray must have its own row address decoders. These row address decoders are shown as decoders 84 in FIG. 8. The row address computers 81 shown in FIG. 11B for the subarray $u=[1,0,0,1,0,1]$ when $q=64$ (i.e., a 256K memory) are representative of (although more complex) than the type of row address computer used in the structure of FIG. 8. Of course, FIG. 8 represents the situation where $q=4$ and the row address computer comprise two lines by two lines, as shown in FIG. 9, rather than six lines by six lines as shown in FIG. 11B.

Assuming randomly generated double errors are relatively rare, increasing access delay and circuit complexity to accommodate automatic double error correction by the hardware may not be worthwhile. Rather the memory management system should detect a multiple error by systematically surveying all of the parity check nodes in the graph as part of the refresh procedure.

A multiple error is detected if there are more than two parity check violations or the two nodes with parity check violation do not check a common bit. Given that a multiple error has been detected, a conservative algorithm for eliminating it when it is a double error is to invoke the double error correcting tree algorithm described above in conjunction with FIG. 6C for all bits checked by a parity that is violated.

In order to carry out the double error correcting tree algorithm for a particular bit, it is sufficient to have the three outputs generated automatically by the single error correction circuitry for all the bits at distance two from the bit in question. Viewing the bit to be corrected as the top bit in a tree such as FIG. 6A, the tree algorithm starts from estimates for the bits at depth 2 provided by the parity node at depth 3. The estimate for a bit at depth 2 is, in fact, one of the three inputs to the majority logic gate when the bit at depth 2 is read. Consequently, the three inputs to the majority logic gate are made available externally, the software correction begins by reading the 2q bits at depth 2 to obtain the information on parity violations at depth 3. This information, combined with the three majority gate inputs from reading the top bit are all that are needed for the tree algorithm. By "reading the top bit" is meant the process by which the top bits read out of the memory by a procedure. Such a procedure has been described above as the single error-correction procedure and involves the reading out of the bit plus at least two parity sums associated with that bit.

To complete the analysis, we verify that the three inputs to the majority logic gate are available for all of the bits in the memory, including the parity bits. Equivalently, a parity sum for each parity node in the graph can be computed. With an architecture such as that illustrated in FIG. 8, the parity of all rows of all subarrays must be even. These are computed by the hardware exclusive-or trees associated with each subarray, such as tree 82 shown in FIG. 8. In terms of the tree of FIG. 6A with bit $(\Phi,\Phi,\Phi)$ at the top, this includes all parity nodes at depth 5 on the left and depth 3 on the right. The exclusive-or tree comprising adders 83-1 through 83-4 that takes one bit from each subarray can compute all the sums for parity nodes at depth 5 on the right and the parity node at depth 1 on the left. The remaining parity sums are the sums of the bits in the extra column as well as the isolated bit of each subarray. One method of computing these is to have a separate parity tree that operates on the extra column of each subarray. Alternatively, and preferably, the current parity sum of the bits in the extra column can easily be computed once each refresh cycle as a matter of course with a single exclusive-or and one additional bit of storage to hold the parity sum so computed as the refresh cycle reads the successive rows.

Correction of double errors requires computation of the address function f; the need arises when the bits at distance two from a given bit must be found. The most difficult part of the calculation is the multiplication of u and w over GF(q). Two methods for accomplishing this are given in Berlekamp, E. R., *Algebraic Coding Theory*, McGraw-Hill 1968, pp. 47–48. This material is hereby incorporated by reference. Alternatively, for a 256K memory it can be done using a 4K ROM.

The error correction capabilities of this last embodiment enable a memory to operate correctly despite the presence of circuit failures that affect more than an isolated bit. The memory can tolerate limited failures in the accessing lines and in the exclusive-or trees, and failure of an entire column of one of the subarrays. It is vulnerable inevitably to error in the final output stage, the three-input majority-logic circuit, and, to a lesser extent, to failure of the address computers and decoders.

The single error-correction procedure will correct all errors that affect only one of the inputs to the majority-logic circuit. If there are no errors in the bits, one of the exclusive-or trees can fail and only one of the three inputs will be wrong. Similarly, a single failure of one of the accessing lines leading to the final output circuit will not produce an output error. When any bit is read, at most one bit is taken from any given column in a given subarray. Thus, so long as there are no other bit errors involved, the memory can perform correctly despite such a column failure.

Address computer and decoder failures are clearly more damaging. A failure confined to one subarray can be tolerated if bits from that subarray are never actually used externally. If the subarray supplies only one bit for the global exclusive-or tree, obviously it cannot hurt the immediate output. Any attempt to read out a bit from that subarray, however, may cause it to furnish two incorrect values.

The circuit is also partially self-checking, because one of the parity nodes in the graph is redundant. No matter what the pattern of bit errors, the number of parity checks that are not satisfied must be an even number. Each bit error causes two parity check violations, and the number of violations must always be 0 mode 2 (i.e., even). Therefore, if ever in refreshing the memory the management system finds an odd number of unsatisfied parity nodes, it indicates that there has been a failure in one of the circuits, not just a data error.

The systems and procedures in this invention embody a number of trade-offs. On the assumption that the actual random soft-error generation rate is typically very low, the parallelism in the error-correcting circuitry has been kept small, and internal correction only takes place at the time of a read or a write or under the control of the memory management system. If random error rate increases, the number of error-correction computations that take place in a given time interval must be increased correspondingly, either by more frequent visits by the management system or more internal parallel correction. This invention particularly lends itself to automatic bit error corrections in a memory during times between read and write thereby to maintain the integrity of the data stored in said memory.

This invention can be applied to memories of various sizes and at different levels of memory organization, depending on the nature of the basic memory unit. At a higher level the heart of the generalization is that what in the embodiments above is described as one bit with an addition operation (exclusive-or) can be replaced by a vector of bits with vector addition (component-wise exclusive-or).

For example, suppose one wanted to build a $2^{21}$ byte memory for an 8-bit byte machine (i.e., a machine where each byte has 8 bits). This could be done by putting each of the $2^7+1=129$ subarrays of one embodiment of a memory in accordance with the present invention on a single chip, with 8 bits or one byte as the memory unit. A subarray is then a $2^{14}=16K$ by 8 bit modified memory. Such a memory could be a random access memory or RAM, for example. The RAM would need an extra 8 columns for the vector sum of the rows and 8 parity trees producing 8 bits in parallel. However, since all 8 bits in a byte have the same address, the RAM needs only one row address computer and one set of row address decoders and column address decoders.

If one just replicated the one bit version 8 times, the addressing hardware would be needlessly replicated as well.

All publications and other references referred to in this application are hereby incorporated by reference in their entirety into this specification.

While several embodiments of this invention have been disclosed, other embodiments of this invention will be obvious to those skilled in the arts in view of this disclosure. This disclosure is meant to be illustrative only and not limiting.

I claim:

1. A system for detecting and correcting errors in binary data bits comprising;
   a digital memory including a first set of addressable storage locations for storing information bits and a second set of additional addressable storage locations for storing redundant check bits, said memory having an architecture defined by a code characterized by a bipartite graph, said graph having a minimum cycle length greater than or equal to six;
   means for generating said redundant check bits from information bits stored in said first set of addressable storage locations, said redundant check bits being chosen to satisfy explicit check equations;
   means for placing the check bits so generated in said second set of additional storage locations;
   means for generating for each bit b stored in said first set or in said second set of addressable storage locations, a first, a second, and a third value,
   said first value being the bit b itself,
   said second value being the sum modulo 2 of the bits at depth 2 of the graph in the tree form of the code having the bit b at the top of the tree which bits at depth 2 are checked by the node at depth 1 on the left side of said tree graph, and
   said third value being the sum modulo 2 of the bits at depth 2 of the tree graph of the code having the bit b at the top of the tree which bits at depth 2 are checked by the node at depth 1 on the right side of said graph in tree form; and
   means for receiving said first, said second, and said third values and for producing a value called the delivered value of b by reading b as the majority vote of said first, said second and said third values.

2. A system as in claim 1 including means for placing the delivered value of a bit b into the storage location in said memory in which the bit b was stored.

3. A system as in claim 1 including means for writing a new value for a given information bit b into b's storage location said means for writing comprising
   means for determining the stored value of the information bit b and the stored values of selected parity check bits associated with said bit b;
   means for complementing said bit b and said selected parity check bits;
   means for determining whether the new value of b equals the delivered value of b;
   means for rewriting, into the memory the delivered value of b if the new value of b equals the delivered value of b and for writing into the memory the complement of the delivered values of b and the complements of said selected parity check bits if the new value of b differs from the delivered value of b.

4. A system as in claim 3 including
   means for detecting a multiple data error and circuit failure including means for computing all parity check sums corresponding to parity check nodes in the code graph corresponding to said memory architecture,
   means for counting the number of parity violations,
   means for detecting a multiple error condition if
      the number of parity violations is even but not 0 or 2, or
      the number of parity violations is 2 but the parity checks that are violated do not correspond to nodes connected by a single bit in the code graph, and
   means for detecting a circuit failure if the number of parity violations is odd.

5. A system as in claim 3 wherein
   said first set of addressable storage locations comprises a rectangular array of storage locations having an addressing where the (i,j)-th storage location in the array is for storing the information bit b(i,j) for $i=0, \ldots, q-1, j=0, \ldots, 1-1$;
   said memory has an architecture defined by a product code whose tree graph has minimum cycle length eight, which is generated by defining the check bits by the parity check equations $$\sum_{t=0}^{l} b(i,t) = 0 \text{ for } i = 0, \ldots, q, \qquad (A)$$

so that $b(i,l) = \sum_{t=0}^{l-1} b(i,t)$, for $i = 0, \ldots, q - 1$, and $$\sum_{t=0}^{q} b(t,j) = 0 \text{ for } j = 0, \ldots, l, \qquad (B)$$

so that $b(q,j) = \sum_{t=0}^{q-1} b(t,j)$, for $j = 0, \ldots, l,$ and wherein said second set of addressable storage locations comprises an additional column of storage locations for storing the check bits b(i,l) where i=0, ..., q and an additional row of storage locations for storing the check bits b(q,j) where j=0, ..., l.

6. A system as in claim 5 wherein said additional storage locations for storing the check bit b(i,l) occupies a position at the end of the i-th row in the l-th column, for i=0, ..., q, and wherein said additional storage locations for storing the check bit b(q,j) occupies a position at the end of the j-th column in the q-th row for j=0, ..., l.

7. A system as in claim 6 wherein said means for generating said first, said second, and said third values comprises:
a row sum parity tree,
a column sum parity tree,
row address decoder means for enabling all of the bits stored in the i-th row of the array to be transmitted in parallel along lines to said row sum parity tree,
column address decoder means for enabling all of the bits stored in the j-th column of the array to be transmitted in parallel along lines to said column sum parity tree,
and wherein said selected parity check bits associated with the bit b(i,j) consist of the last bit in the i-th row, b(i,l), the last bit in the j-th column, b(q,j), and the corner bit in the array, b(l,q).

8. A system as in claim 7 wherein
said first value is the bit b(i,j),
said second value is $$\sum_{t=0}^{q} b(t,j) + b(i,j),$$

which is the sum of all bits in the j-th column except the bit b(i,j) itself, and said third value is $$\sum_{t=0}^{l} b(i,t) + b(i,j),$$

which is the sum of all bits in the i-th row except the bit b(i,j) itself.

9. A system as in claim 7 wherein
said row sum parity tree comprises exclusive-or gates for computing the sum modulo 2 of the bits in the i-th row, plus the bit b(i,j);
said column sum parity tree comprises exclusive-or gates for computing the sum modulo 2 of the bits in the j-th column plus the bit b(i,j); and wherein said
means for receiving said first, said second, and said third values and for producing said value called the delivered value of b comprises a majority logic gate including three input leads for receiving said first, said second and said third value and for producing the value 0 or 1 that occurs most frequently on said input leads.

10. A system as in claim 9 including
means for detecting a multiple data error and circuit failure comprising
means for first computing all row parity sums and column parity sums;
means for detecting a multiple error condition if
(a) the number of parity violations is even but not 0 or 2, or
(b) the number of violations is 2 but there is more than one row parity violation or more than one column parity violation, and
means for detecting a circuit failure if the number of parity violations is odd.

11. A system as in claim 3 wherein said first set of addressable storage locations comprises
a square array having an addressing wherein the (i,j)th location in the array is for storing the information bits b(i,j) for i=0, ..., q−1, j=0, ..., q−1,
said code is a modified product code whose tree graph has minimum cycle length eight and whose check bits are defined by imposing the following parity check equations:

$$\sum_{t=0}^{l} b(i,t) = 0 \text{ for } i = 0, \ldots, q - 1 \qquad (A)$$

so that $b(i,l) = \sum_{t=0}^{l-1} b(i,t)$ for $i = 0, \ldots, (q - 1),$ i.e., the bit b(i,l) is the sum of the information bits in the i-th row, and $$\sum_{k=0}^{q} b(i - k, k) = 0 \text{ for } i = 0, \ldots, q, \qquad (B)$$
$(i - k \text{ taken mod } q + 1),$ so that b(q,j) for j=0, ..., l is the sum of the other bits on the cyclically continued diagonal passing through the location (i,j) and wherein said second set of addressable storage locations comprises an added column for storing the check bits b(i,l), i=0, ..., q−1 and an added row for storing the check bits b(q,j) for j=0, ..., l and wherein b(i,l) occupies a position at the end of the i-th row in l-th column, and b(q,j) occupies a position at the bottom of the j-th column in the q-th row.

12. A system as in claim 11 wherein for each bit b(i,j)
said means for generating generates a first value equal to the value b(i,j),
said means for generating generates a second value equal to $$\sum_{k=0}^{q} b(i,t) + b(i,j),$$

which is the parity sum of its row plus the bit itself, and said means for generating generates a third value equal to $$\sum_{k=0}^{q} b(i - k, k) + b(i,j), (i - k \text{ taken mod } q + 1)$$

which is the parity sum of its cyclic diagonal plus the bit itself.

13. A system as in claim 12 wherein said selected parity check bits associated with said bit b(i,j) are
b(q,i),
b(i,q), and
b(q,i+j+1 mod(q+1)).

14. A system as in claim 13 wherein said means for generating said first, said second, and said third values comprises:
a parity summing network adjacent to said array;
row address decoder means for enabling all of the bits stored in the i-th row of the array to be transmitted to said parity summing network adjacent to the array;
diagonal address decoder means for enabling all of the bits stored along a cyclically continued diagonal of the array to be transmitted to said parity summing network;
and wherein said selected parity check bits associated with the bit b(i,j) comprise the bits b(i,l), the i-th bit in the q-th row, b(q,i), the bit b(q,(i+j+1) mod q+1), located where the diagonal passing through b(i,j) passes through the q-th row,
and wherein said means for determining the value of said selected parity check bits includes means for accessing said selected parity check bits.

15. A system as in claim 14 wherein said parity summing network comprises a plurality of exclusive-or gates for computing the sum modulo 2 of the bit b(i,j) and the bits in the diagonal containing b(i,j) and the modulo 2 sum of the bit b(i,j) and the bits in the row containing b(i,j), and wherein said means for delivering comprises
a majority logic gate containing input leads for receiving said modulo 2 sums computed by said plurality of exclusive-or gates and the stored value of b(i,j), that produces the value 0 or 1 that occurs most frequently on its input leads.

16. A system as in claim 15 including a multiple data error and circuit failure detection circuit comprising
means for computing all row parity sums and diagonal parity sums,
means for counting the number of parity violations, and
means for detecting a multiple error condition if
(a) the number of parity violations is even but not 0 or 2, or
(b) the number of violations is 2 but there is more than 1 row parity violation or more than one diagonal parity violation, and
means for detecting a circuit failure if the number of parity violations is odd.

17. The system in claim 3 wherein
the memory is in the form of a series of q+1 rectangular arrays having a natural addressing wherein said first set of storage locations comprises the (v,w) location in the u-th array for storing the information bit b(u,v,w) for u=0, ..., q−1, v=0, 1, ..., (l−1), w=0, 1, ..., (q′−1),
the code consists of a series of independent product codes generated by defining check bits for the u=q subarray and the w=q′ columns by the parity check equations $$\sum_{k=0}^{q'} b(u,v,k) = 0 \text{ for } u = 0, \ldots, q, \text{ and } v = 0, \ldots, l-1 \quad (A)$$

so that a bit in the q′-th column of a subarray is the sum modulo 2 of the other bits in the same row and subarray;

$$\sum_{k=0}^{q} b(k,v,w) = 0 \text{ for } v = 0, \ldots, l-1, \text{ and } w = 0, \ldots, q' \quad (B)$$

so that the bit b(q,v,w) is the modulo 2 sum of all of the bits in the same row and column in all of the u subarrays for u not equal to q
and wherein said second set of storage locations comprises the u=q-th subarray for storing the check bits b(q,v,w) for v=0, ..., l−1, and w=0, ..., q′−1 as defined above and a q′-th column for the u-th subarray for storing the check bits b(u,v,q′).

18. The system as in claim 17 wherein for each bit b(u,v,w)
said first value is the bit b(u,v,w),
said second value is $$\sum_{k=0}^{q'} b(u,v,k) + b(u,v,w),$$

the sum modulo 2 of all other bits in the same subarray and row, and said third value is $$\sum_{k=0}^{q} b(k,v,w) + b(u,v,w),$$

the sum modulo 2 of all other bits in the same row and column in the subarrays.

19. The system as in claim 18 wherein said selected parity check bits associated with the bit b(u,v,w) are
b(u,v,q′),
b(q,v,w) and
b(q,v,q′).

20. The system as in claim 19 wherein said means for generating a first, a second, and a third value comprises:
a parity summing network;
addressing means to said memory for selecting the bit b(u,v,w) from the u-th subarray and the bits b(k,v,w) from the k-th subarray for each k varying from 0 to q and for providing these bits to said parity summing network;
and wherein said means for determining the stored value of the bit b(u,v,w) and of said associated selected parity check bits include means for accessing and reading out bit b(u,v,w) and bit b(u,v,q′) from the v-th row of the u-th subarray and bit b(q,v,w) and bit b(q,v,q′) from the v-th row of the u=q subarray.

21. The system as in claim 20 wherein said parity summing network includes
a parity tree of exclusive-or gates associated with the u-th subarray for each u=0, 1, ..., q that computes the sum modulo 2 of the bits in a row of that subarray,
a parity tree with one input from each of the q+1 subarrays that computes the modulo 2 sum of single bits selected from each of the subarrays, and wherein said means for delivering comprises a majority logic gate containing input lines for receiving the sum modulo 2 of the bit b(u,v,w) and of the bits in the row containing b(u,v,w) and the sum modulo 2 of the bit b(u,v,w) and of the single bits selected from each of the subarrays and the value of the bit b(u,v,w), said majority logic gate producing the value 0 or 1 that occurs most frequently on its input lines.

22. A system as in claim 21 including
means for detecting a multiple data error and circuit failure comprising
means for first computing the row parity sums for the v-th row of each of the q+1 subarrays and the parity sum of all bits in the v-th row and w-th column of every subarray, one sum for each w, and
means for counting the number of parity violations, and
means for detecting a multiple error condition if
(a) the number of parity violations is even but not 0 or 2, or
(b) the number of violations is 2 but there is more than 1 row parity violation or more than one w with parity violation, and
means for detecting a circuit failure if the number of parity violations is odd.

23. The system as in claim 1 wherein
the memory is in the form of a series of q+1 subarrays each storing $q(q+1)+1$ bits where q is a prime power, and
the code is based on a projective plane graph having minimum cycle length twelve.

24. A system as in claim 23 wherein
the code is based on a projective plane constructed from a tree using the function f(u,v,w)= where
$x = u$,
$y = v - uw$, and
$z = u$
so that each of the $q^3$ information bits b has a natural indexing as b(u,v,w) and another indexing as b and said check bits comprise $2q^2 + 2q + 1$ check bits.

25. The system as in claim 24 wherein said first set of addressable storage locations comprises q subarrays having q rows and q columns, wherein said second set of addressable storage locations comprises
a column with q storage locations associated with each of said subarrays,
a special subarray with $q^2 + q$ storage locations, and
q+1 additional storage locations each corresponding to one of said q+1 subarrays, and wherein
said first value for determining the delivered value of the information bit $b(u_O, v_O, w_O)$ equals $b(u_O, v_O, w_O)$,
said second value equals $$b(u_O, v_O, \Phi) + \sum_{w=0}^{q-1} b(u_O, v_O, w) + b(u_O, v_O, w_O),$$

which is the exclusive-or sum of the entire $v_O$ row of the $u_O$ subarray, including the extra $(u_O, v_O, \Phi)$ bit stored in said additional storage location associated with said $u_O$ subarray, exclusive-or'd with the bit value itself, and
said third value equals $$b(\Phi, v'_O, w_O) + \sum_{u=0}^{q-1} b(u, v'_O + uw_O, w_O) + b(u_O, v_O, w_O)$$

with $v'_0 = (v_0 - u_0 w_0)$, where $b(\Phi, v'_O, w_O)$ is a check bit in said special subarray referred to as the $(\Phi, v', w)$ subarray for the right side of a code graph in tree form with elements indexed by $v'_O$ and $w_O$, and where the third value is the exclusive-or sum of one information bit from each subarray of said first set of addressable storage locations, one check bit from the column associated with the $(\Phi, v', w)$ subarray, and the bit itself.

26. The system as in claim 25 wherein said parity check bits associated with a bit $b(u_O, v_O, w_O)$ are
$b(u_O, v_O, \Phi)$, the check bit at depth 4 on the left side of a code graph in tree form above the bit $b(u_O, v_O, w_O)$,
$b(u_O, \Phi, \Phi)$, the check bit at depth 2 on the left side of said tree which is above the check bit $b(u_O, v_O, \Phi)$,
$b(\Phi, v'_O, w_O)$, the check bit at depth 4 on the right side of said tree above the bit $b(u_O, v_O, w_O)$,
$b(\Phi, \Phi, w_O)$, the check bit at depth 2 on the right side of said tree which is above the check bit $b(u_O, v_O, \Phi)$, and
$b(\Phi, \Phi, \Phi)$, the check bit at the root of the tree.

27. The method of determining the correct value of a bit b stored in a digital memory, where the bit b corresponds to a root of a code graph in tree form having a plurality of parity nodes, despite the presence of two bit errors in said digital memory, said method comprising:
forming the sum modulo 2 of all of the bits connected to each of said parity nodes at depth 3 of said code graph in tree form with bit b as the root,
indicating a parity violation at any said parity node if the sum modulo 2 of all the bits connected to that node are not zero by placing an "X" on the bit node at depth 2 of said tree adjacent to that parity node, where "X" is a symbol representing an uncertain value,
producing a left side estimate for the value of the bit at the top of the tree by summing modulo 2 the bits at depth 2 on the left side of said tree, classifying the sum an "X" if any of the bits in the sum has a value "X",
producing a right side estimate for the value of the bit at the top of the tree by computing the sum modulo 2 of all of the bits at depth 2 in the right side of said tree, classifying the sum a "X" if any one of the bits in the sum has a value "X",
estimating the value of the top node from said left side estimate, said right side estimate, and the stored value of the bit itself.

28. The method of claim 27 including
giving a weight of 2 to an estimate of 0 or 1;
giving no weight to an estimate of "X";
giving a weight of one to the value of 0 or 1 stored for the bit;
selecting the value with the largest total weight as the correct value.

29. The method of claim 28 including the step of writing the correct value into the memory.

30. A memory system comprising a plurality of subarrays for storing bits, means for storing an extra bit associated with each of said subarrays, and means for detecting and correcting errors in bits stored therein, said means for detecting and correcting comprising:
a parity tree for each subarray;
an additional parity tree having one input lead from each subarray;
means for accessing all of the bits stored in said memory comprising
a row address computer for each of the subarrays, a row address decoder for each subarray enabling all of the bits stored in the row selected by the row address computer of a given subarray to be transmitted in parallel along lines to said parity tree for that subarray, column address select means for selecting any one of the bits from a chosen row or the extra bit from the means for storing associated with the subarray containing the chosen row to be used as the input to said additional parity tree.

31. The memory system as in claim 30 based on a code derived from a projective plane including means for accessing six bits required for writing a bit into memory consisting of means for writing in the memory the last bit in the same row and subarray as the bit $b(u,v,w)$, the extra bit of that subarray, the bit with the same w and computed $v'$ in the $u=\Phi$ subarray, the last bit in the same w row of the $u=\Phi$ subarray, and the extra bit of the $u=\Phi$ subarray to be read, all complemented if the stored value of $b(u,v,w)$ differs from the value of $b(u,v,w)$ and stored again in the array.

32. The memory system as in claim 31 including a parity tree of exclusive-or gates for computing the sum modulo 2 of the bits in a selected row of each of said subarrays, a parity tree of exclusive-or gates that has an input signals one selected bit from each of the subarrays, means for computing the modulo 2 sum of the bits in the last column and the extra bit associated with each subarray, and a majority logic gate having input leads for receiving signals from said parity trees and said means for computing and that outputs the value 0 of 1 that occurs most frequently on its input lines.

33. The memory system as in claim 32 including means for detecting a multiple data error and circuit failure comprising means for computing the parity sums for all parity nodes in the projective plane graph, means for counting the number of parity violations, means for detecting a multiple error condition if
 (a) the number of parity violations is even but not 0 or 2, or
 (b) the number of violations is 2 but the two parity nodes corresponding to those violations are not connected by a single bit in the projective plane graph, and means for detecting a circuit failure if the number of parity violations is odd.

34. A system for detecting the failure of a circuit component in a memory system comprising means for calculating a first and a second parity check sum for each bit stored in said memory;

means for determining whether or not each of said first and said second parity check sums is even or odd;

means responsive to said means for determining whether each of said first and said second parity check bits is even or odd for determining whether or not an odd number of said parity check sums is odd, an odd number of said parity check sums being odd indicating a circuit component failure of a type other than a bit error in said memory.

35. A system as in claim 34 further including means for causing said means for calculating to calculate said first and said second parity check sums for each bit at selected times between read and write.

36. A system of claim 34 wherein said means for calculating comprises means for addressing each bit stored in said memory in sequence and means for directing said means for calculating to calculate all of said first and said second parity check sums in a particular sequence.

* * * * *